(12) United States Patent
Widmer et al.

(10) Patent No.: US 10,014,104 B2
(45) Date of Patent: Jul. 3, 2018

(54) COIL ARRANGEMENTS IN WIRELESS POWER TRANSFER SYSTEMS FOR LOW ELECTROMAGNETIC EMISSIONS

(71) Applicant: QUALCOMM Incorporated, San Diego, CA (US)

(72) Inventors: Hanspeter Widmer, Wohlenschwill (CH); Nicholas A. Keeling, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 13/786,231

(22) Filed: Mar. 5, 2013

(65) Prior Publication Data

US 2014/0125140 A1    May 8, 2014

Related U.S. Application Data

(60) Provisional application No. 61/722,077, filed on Nov. 2, 2012.

(51) Int. Cl.
*H01F 38/14*    (2006.01)
*H02J 50/12*    (2016.01)
(Continued)

(52) U.S. Cl.
CPC .......... *H01F 38/14* (2013.01); *B60L 11/182* (2013.01); *H02J 5/005* (2013.01); *H02J 7/025* (2013.01);
(Continued)

(58) Field of Classification Search
CPC .......... H01F 38/14; H02J 7/025; B60L 11/182
See application file for complete search history.

(56) References Cited

U.S. PATENT DOCUMENTS 6,100,663 A * 8/2000 Boys .............. B60L 11/182
                                                  320/108
6,407,470 B1   6/2002 Seelig
(Continued)

FOREIGN PATENT DOCUMENTS

CN      102577011 A    7/2012
JP      2012517118 A   7/2012
(Continued)

OTHER PUBLICATIONS

Budhia, et.al., "Development and evaluation of single sided flux couplers for contactless electric vehicle charging," 2011 IEEE energy conversion congress and exposition(ECCE), Sep. 17-22, pp. 614-621.*

(Continued)

*Primary Examiner* — Thienvu Tran
*Assistant Examiner* — Pinping Sun
(74) *Attorney, Agent, or Firm* — Knobbe, Martens, Olson & Bear, LLP

(57) ABSTRACT

This disclosure provides systems, methods and apparatus for wireless power transfer. In one aspect the disclosure provides an apparatus for wirelessly communicating power. The apparatus includes a first conductive structure, with a length greater than a width, configured to wirelessly receive power via a magnetic field. The first conductive structure includes two substantially co-planar loops. The first conductive structure has a first edge and a second edge each intersecting a geometric line along the length of the first conductive structure. The apparatus further includes a second conductive structure, with a length greater than width, positioned between the first conductive structure and a magnetic material and configured to wirelessly receive power via the magnetic field. The length of the second conductive structure is substantially equal to at least a distance along the (Continued)

geometric line between the first edge and the second edge of the first conductive structure.

43 Claims, 22 Drawing Sheets

(51) Int. Cl.
    *B60L 11/18*     (2006.01)
    *H02J 7/02*     (2016.01)
    *H02J 5/00*     (2016.01)
    *H01F 3/00*     (2006.01)

(52) U.S. Cl.
    CPC ........ *H02J 50/12* (2016.02); *H01F 2003/005* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(56) References Cited

U.S. PATENT DOCUMENTS

| | | | | |
|---|---|---|---|---|
| 6,949,930 | B2* | 9/2005 | Hansen | G01V 3/15 324/329 |
| 7,781,916 | B2* | 8/2010 | Boys | H02J 5/005 307/104 |
| 8,934,857 | B2* | 1/2015 | Low | H02J 7/025 455/129 |
| 2010/0109604 | A1* | 5/2010 | Boys | B60L 8/006 320/109 |
| 2011/0115430 | A1 | 5/2011 | Saunamaeki | |
| 2012/0112552 | A1 | 5/2012 | Baarman et al. | |
| 2012/0228957 | A1 | 9/2012 | Miyauchi | |
| 2012/0235636 | A1 | 9/2012 | Partovi | |
| 2012/0306282 | A1* | 12/2012 | Tan | H02J 5/005 307/104 |
| 2014/0070764 | A1* | 3/2014 | Keeling | H02J 50/50 320/108 |

FOREIGN PATENT DOCUMENTS

| | | | |
|---|---|---|---|
| JP | 2013501665 A | 1/2013 | |
| WO | 2004038888 A2 | 5/2004 | |
| WO | WO 2010090539 A1 * | 8/2010 | ............ H02J 5/005 |
| WO | WO-2010090539 A1 | 8/2010 | |
| WO | WO-2011016736 A2 | 2/2011 | |
| WO | WO-2012018268 A1 | 2/2012 | |
| WO | WO-2012018269 A1 | 2/2012 | |

OTHER PUBLICATIONS

Elliott, et.al., "Multiphase Pickups for Large Lateral Tolerance Contactless Power-transfer Systems," industrial electronics, IEEE Transactions on vol. 57, iss, 5, Apr. 14, 2010, pp. 1590-1598.*
Covic, et. al., "A bipolar Primary Pad Topology for EV Stationary CHarging and Highway Power by inductive coupling," Energy COnversion Congress and Exposition (ECEE) Sep. 17-22, 2011, pp. 1832-1838.*
Zaheer, et al., "A bipolar receiver pad in a lumped IPT system for electric vehicle charging applications," Energy Conversion Congress and exposition (ECCE), Sep. 15-20, 2012,pp. 283-290.*
Budhia, et al., "Development and evaluation of single sided flux couplers for contactless electric vehicle charging," Energy conversion congress and Exposition, Sep. 17-22, 2011.*
Physics 341,"chapter 4, polarization" Sep. 4, 2011, pp. 1-18.*
Taiwan Search Report—TW102138311—TIPO—Aug. 24, 2015.
International Search Report and Written Opinion—PCT/US2013/064957—ISA/EPO—dated Jul. 23, 2014.
Covic G.A., et al., "A bipolar primary pad topology for EV stationary charging and highway power by inductive coupling", Energy Conversion Congress and Exposition (ECCE), 2011, IEEE, IEEE, Sep. 17, 2011 (Sep. 17, 2011), pp. 1832-1838, XP032067402.

\* cited by examiner

2400 ↘

2402
Wirelessly receive power via a first conductive structure via a magnetic field, the first conductive structure having a length greater than a width, the first conductive structure comprising a first loop and a second loop enclosing a first area and a second area, respectively, the first loop having a first lower surface and the second loop having a second lower surface that are substantially coplanar, the first conductive structure having a first edge and a second edge each intersecting a geometric line along the length of the first conductive structure 2404
Wirelessly receive power via a second conductive structure positioned between the first conductive structure and a magnetic material, the second conductive structure enclosing a third area, the second conductive structure having a length greater than a width, the length of the second conductive structure being substantially equal to at least a distance along the geometric line between the first edge and the second edge of the first conductive structure

2502
A first means for wirelessly receiving power via a magnetic field, the first receiving means having a length greater than a width, the first receiving means comprising a first loop and a second loop enclosing a first area and a second area, respectively, the first loop having a first lower surface and the second loop having a second lower surface that are substantially coplanar, the first receiving means having a first edge and a second edge each intersecting a geometric line along the length of the first receiving means 2504
A second means for wirelessly receiving power via the magnetic field positioned between the first receiving means and a magnetic material, the second receiving means enclosing a third area, the second receiving means having a length greater than a width, the length of the second receiving means being substantially equal to at least a distance along the geometric line between the first edge and the second edge of the first receiving means

FIG. 25

COIL ARRANGEMENTS IN WIRELESS POWER TRANSFER SYSTEMS FOR LOW ELECTROMAGNETIC EMISSIONS

CROSS REFERENCE TO RELATED APPLICATIONS

This application claims priority to and the benefit under 35 U.S.C. § 119(e) of U.S. Provisional Patent Application No. 61/722,077 entitled "COIL ARRANGEMENTS IN WIRELESS POWER TRANSFER SYSTEMS FOR LOW ELECTROMAGNETIC EMISSIONS" filed on Nov. 2, 2012, the disclosure of which is hereby incorporated by reference in its entirety.

FIELD

The present disclosure relates generally to wireless power transfer, and more specifically to devices, systems, and methods related to wireless power transfer to remote systems such as vehicles including batteries. More particularly, the present disclosure relates to coil arrangements for induction coils in a wireless power transfer system.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for wirelessly communicating power. The apparatus includes a first conductive structure configured to wirelessly receive power via a magnetic field. The first conductive structure has a length greater than a width. The first conductive structure includes a first loop and a second loop enclosing a first area and a second area, respectively. The first loop has a first lower surface and the second loop has a second lower surface that are substantially coplanar. The first conductive structure has a first edge and a second edge each intersecting a first geometric line along the length of the first conductive structure. The apparatus further includes a second conductive structure positioned between the first conductive structure and a magnetic material and configured to wirelessly receive power via the magnetic field. The second conductive structure includes a third loop enclosing a third area. The second conductive structure has a length greater than a width. The length of the second conductive structure is substantially equal to at least a distance along the first geometric line between the first edge and the second edge of the first conductive structure.

Another aspect of the subject matter described in the disclosure provides an implementation of a method of wirelessly communicating power. The method includes wirelessly receiving power via a first conductive structure via a magnetic field. The first conductive structure has a length greater than a width. The first conductive structure includes a first loop and a second loop enclosing a first area and a second area, respectively. The first loop has a first lower surface and the second loop has a second lower surface that are substantially coplanar. The first conductive structure has a first edge and a second edge each intersecting a geometric line along the length of the first conductive structure. The method further includes wirelessly receiving power via a second conductive structure positioned between the first conductive structure and a magnetic material, The second conductive structure encloses a third area. The second conductive structure has a length greater than a width. The length of the second conductive structure is substantially equal to at least a distance along the geometric line between the first edge and the second edge of the first conductive structure.

Yet another aspect of the subject matter described in the disclosure provides an apparatus for wirelessly receiving communicating power. The apparatus includes a first means for wirelessly receiving power via a magnetic field. The first receiving means has a length greater than a width. The first receiving means includes a first loop and a second loop enclosing a first area and a second area, respectively. The first loop has a first lower surface and the second loop has a second lower surface that are substantially coplanar. The first receiving means has a first edge and a second edge each intersecting a geometric line along the length of the first receiving means. The apparatus further includes a second means for wirelessly receiving power via the magnetic field positioned between the first receiving means and a magnetic material. The second receiving means encloses a third area. The second receiving means has a length greater than a width. The length of the second receiving means is substantially equal to at least a distance along the geometric line between the first edge and the second edge of the first receiving means.

Another aspect of the subject matter described in the disclosure provides an apparatus for wirelessly communicating power. The apparatus includes a transmit circuit configured to output a time-varying signal. The apparatus further includes a conductive structure configured to receive the time-varying signal and to generate an electromagnetic field at a level sufficient to wirelessly transfer power for powering or charging a receiver device. The conductive structure has a rectangular form factor having a width a and a length a+b, and wherein a divided by b is substantially equal to a+b divided by a.

Another aspect of the subject matter described in the disclosure provides an implementation of a method of wirelessly communicating power. The method includes outputting a time-varying signal from a transmit circuit. The method further includes receiving the time-varying signal and generating, at a conductive structure, an electromagnetic field at a level sufficient to wirelessly transfer power for powering or charging a receiver device, the conductive structure having a rectangular form factor having a width a and a length a+b, and wherein a divided by b is substantially equal to a+b divided by a.

Another aspect of the subject matter described in the disclosure provides an apparatus of wirelessly communicating power. The apparatus includes means for outputting a time-varying signal. The apparatus further includes means for generating an electromagnetic field based on the time-varying signal. The electromagnetic field is at a level sufficient to wirelessly transfer power for powering or charging a receiver device. The generating means has a rectangular form factor having a width a and a length a+b, and wherein a divided by b is substantially equal to a+b divided by a.

Another aspect of the subject matter described in the disclosure provides an apparatus for wirelessly communicating power. The apparatus includes a first conductive structure configured to wirelessly transmit or receive power via a first electromagnetic field at a level sufficient to power or charge a load. The first conductive structure includes a first loop enclosing a first area. The apparatus further includes a second conductive structure configured to wirelessly transmit or receive power via a second electromagnetic field at a level sufficient to power or charge the load. The second conductive structure is positioned inside the first area and is substantially co-planar with the first conductive structure. The second conductive structure includes a second loop and a third loop enclosing a second area and a third area, respectively. The second loop has a second lower surface and the third loop has a third lower surface that are substantially coplanar.

Another aspect of the subject matter described in the disclosure provides an implementation of a method of wirelessly communicating power. The method includes wirelessly transmitting or receiving power, at a first conductive structure, via a first electromagnetic field at a level sufficient to power or charge a load. The first conductive structure includes a first loop enclosing a first area. The method further includes wirelessly transmitting or receiving power, at a second conductive structure, via a second electromagnetic field at a level sufficient to power or charge the load. The second conductive structure is positioned inside the first area and is substantially co-planar with the first conductive structure. The second conductive structure includes a second loop and a third loop enclosing a second area and a third area, respectively. The second loop has a second lower surface and the third loop has a third lower surface that are substantially coplanar.

Another aspect of the subject matter described in the disclosure provides an apparatus for wirelessly communicating power. The apparatus includes a first means for wirelessly transmitting or receiving power via a first electromagnetic field at a level sufficient to power or charge a load. The first means includes a first loop enclosing a first area. The apparatus further includes a second means for wirelessly transmitting or receiving power via a second electromagnetic field at a level sufficient to power or charge the load. The second means is positioned inside the first area and is substantially co-planar with the first means. The second means includes a second loop and a third loop enclosing a second area and a third area, respectively. The second loop has a second lower surface and the third loop has a third lower surface that are substantially coplanar.

BRIEF DESCRIPTION OF THE DRAWINGS

FIG. 24 is a flowchart of an implementation of a method of wirelessly communicating power, in accordance with an embodiment.

FIG. 25 is a functional block diagram of a wireless power receiver, in accordance with an exemplary embodiment.

Figure 1:
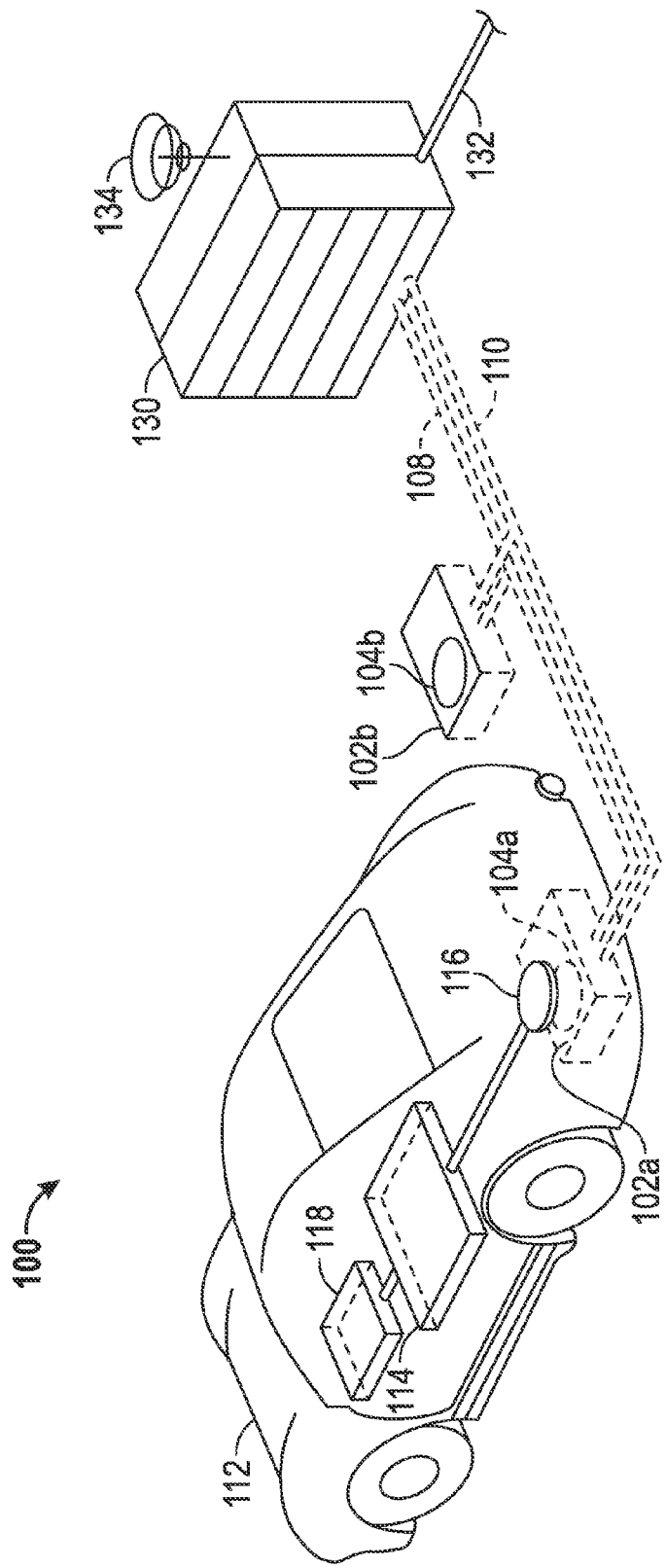
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. It will be apparent to those skilled in the art that the exemplary embodiments may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a either transfers power to the electric vehicle 112 or the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

In some other use cases, power flow in the reverse direction may only be a small amount, as part of a process to improve alignment of the transmitter and receiver devices, or to identify which transmitter device is appropriately placed for transferring power to the receiver device.

It will be therefore be understood that the terms "transmitter", "receiver", "primary" and "secondary" and the like are used herein to refer to the normal uses of the components of the wireless power transfer system when used for transferring power from the power supply to the electric vehicle, i.e., from the transmitter or primary device to the receiver or secondary device. Therefore the "transmitter" may also be used to receive power and the "receiver" may also be used to transmit power. The use of these terms, although referring to the normal sense of operation of certain components of the system for ease of understanding, does not limit the invention to any particular operation of such components.

Figure 2:
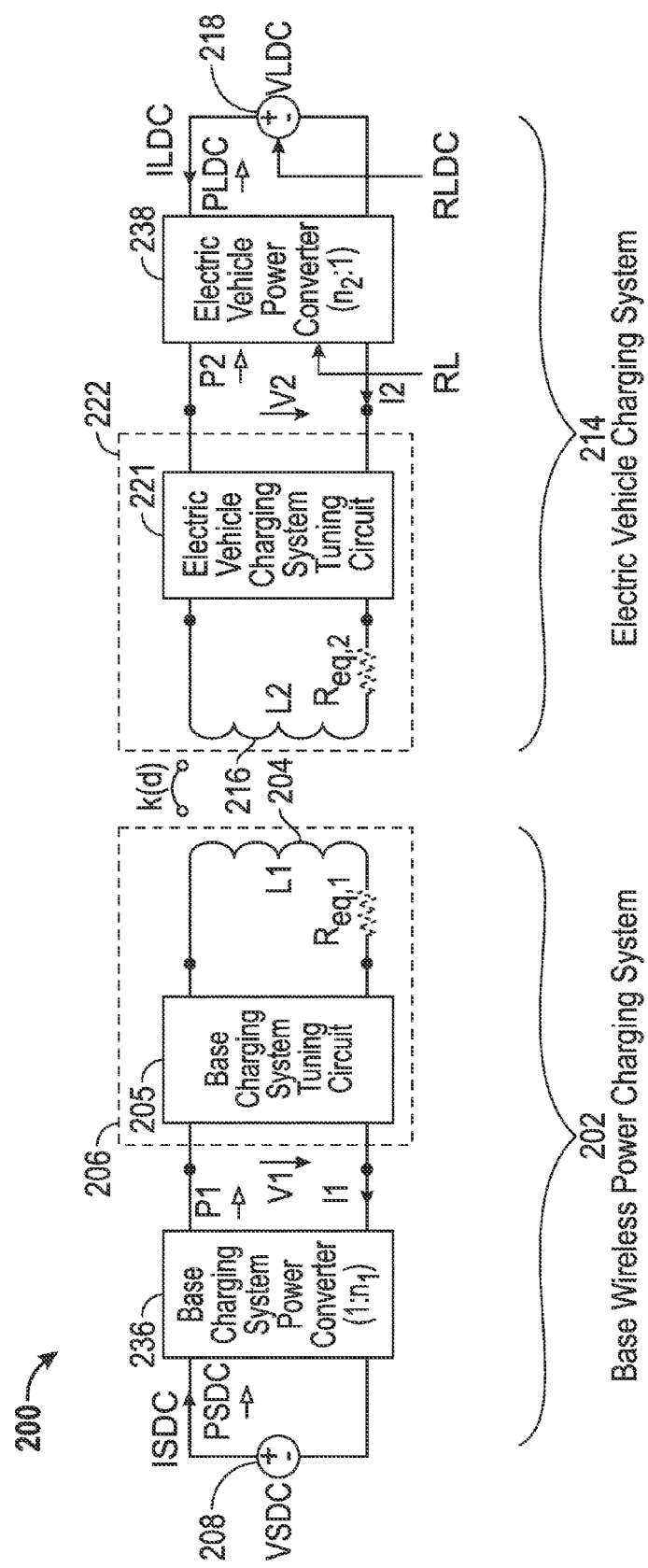
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205. The base charging system tuning circuit 205 may be provided to form a resonant circuit with the base system induction coil 204 at desired frequency. The tuning circuit 205 may include one or more reactive tuning components (e.g., one or more capacitors) coupled to the base system induction coil 204. The reactive tuning components may be electrically connected in a series or parallel configuration with the base system induction coil 204 or any combination of a series and parallel configuration.

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 116. The electric vehicle charging system tuning circuit 221 may be provided to form a resonant circuit with the electric vehicle induction coil 216 at a desired frequency. The turning circuit 221 may include one or more reactive tuning components (e.g., one or more capacitors) coupled to the electric vehicle induction coil 216. The reactive tuning components may be electrically connected in a series or parallel configuration with the electric vehicle induction coil 216 or any combination of a series and parallel configuration. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 316 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

It will be understood that for the sake of simplicity above descriptions and the block diagram of FIG. 2 have been limited to a single channel wireless power transmitter and a single channel wireless power receiver, meaning that there is a single power source driving a single primary induction coil and there is a single secondary induction coil (pick-up) delivering power to a single power sink e.g., a rectifier. However, the wireless power transfer system 200 may be a multi-channel-type system comprising of multiple (aggregated) power sources driving multiple primary induction coils, and multiple secondary induction coils delivering power to multiple power sinks (e.g., rectifiers). Dual-channel configurations may be used to operate a system using coil arrangements, in accordance with certain embodiments described herein.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 214, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the electromagnetic field and generates output power for storage or consumption by the electric vehicle 112. As described above, in some embodiments, the base system induction coil 204 and electric vehicle induction coil 216 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency and/or at lower power. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used. In this specification the term "coil" may be used in the sense of a conductive structure or having a number of turns of electrically conducting material that all wind around a single central point. The term "coil arrangement" is used to mean any winding arrangement of conducting material, which may comprise a number of "coils". In some exemplary embodiments, Litz wire may be used to form the coil arrangements.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Inductive power transfer (IPT) systems as described in part with reference to FIGS. 1 and 2 provide one example of wireless transfer of energy. In IPT, a primary (or "transmitter") power device transmits power to a secondary (or "receiver") power receiver device. Each of the transmitter and receiver power devices include inductors, typically an arrangement of coils or windings of electric current conveying media. An alternating current in the primary inductor produces an alternating magnetic field. When the secondary inductor is placed in proximity to the primary inductor, the alternating magnetic field induces an electromotive force (EMF) in the secondary inductor, thereby transferring power to the secondary power receiver device.

Figure 3:
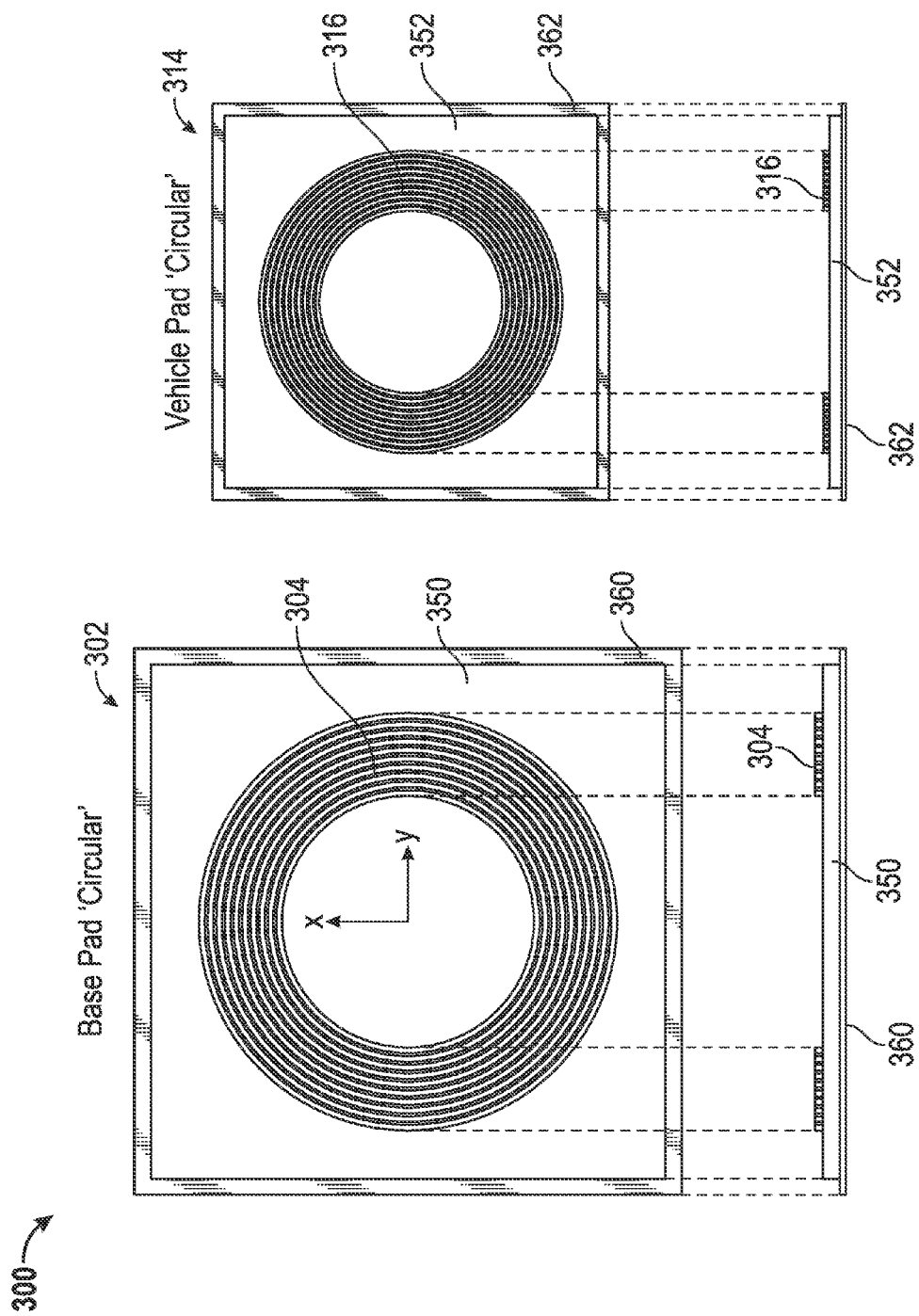
FIG. 3 is a top and profile view of an inductive power transfer system including an exemplary embodiment of a base pad and a vehicle pad.

FIG. 3 is a top and profile view of an inductive power transfer system 300 including an exemplary embodiment of a base pad 302 and a vehicle pad 314. In electric vehicle and plug-in hybrid vehicle IPT systems, the primary power device may be situated on the ground and may be known as a "base" device or base pad 302. In an aspect, a base pad 302 may correspond to a base wireless charging system 102a including a base system induction coil 104 as described above with reference to FIGS. 1 and 2. The secondary power device may be situated on the electric vehicle and may be known as a "pick-up" device or vehicle pad 314. In an aspect, the vehicle pad 314 may correspond to an electric vehicle wireless charging system 114 including an electric vehicle induction coil 116 as descried above with reference to FIGS. 1 and 2. These devices are used to transmit power from the ground to a vehicle 112 (FIG. 1).

The base pad 302 includes a primary coil 304 configured to generate an alternating magnetic field for providing power transfer as described above. The base pad 302 further includes a magnetic material 350 (e.g., a ferrite structure) and a conductive back plate 360. The magnetic material 350 is positioned between the coil 304 and the conductive back plate 360. The vehicle pad 314 includes a secondary coil 316 configured to generate a current in response to the magnetic field generated by the primary coil 304 such that power may be provided to a load (not shown). The vehicle pad 314 further includes a magnetic material 352 positioned between the coil 316 and a conductive back plate 362. It should be appreciated that the IPT system may further include one or more of the components shown in FIG. 1 or 2 or otherwise described below.

In the following description, it is assumed that the base pad 302 is situated on the ground and the vehicle pad 314 is mounted at bottom (underbody) of the vehicle 112 e.g., in the center of the vehicle 112 providing maximum distance and protection for persons from being exposed to magnetic fields. Moreover, in accordance with certain embodiments, both the base pad 302 and the vehicle pad 314 are substantially planar structures expanding in horizontal directions (x, y-dimensions) and with low height (profile) in the vertical (z-) dimension.

The IPT system 300 may also be able to function in a mode in which power is transferred the other way, i.e., from the vehicle to the grid (V2G). In this mode, the vehicle pad 314 is technically the primary device and the base pad 302 is the secondary device because the vehicle pad 314 induces an electromotive force (EMF) in the base. This may allow power stored in an electric vehicle battery 118 (FIG. 1) to be transferred back to a mains electricity grid.

In an electric vehicle IPT system 300, tolerance in the longitudinal (i.e., forwards/backwards relative to the vehicle 112) direction and the transverse (i.e., side-to-side) direction is desirable. In different situations, it may be beneficial to have a greater degree of tolerance to misalignment in the longitudinal or transverse direction. It is therefore desirable for an electric vehicle IPT system 300 to have flexibility in tolerance to suit the requirements of a particular situation.

PCT publication no. WO 2010/090539 discloses an IPT system for powering electric vehicles in which a base (usually the primary) coil arrangement, typically positioned on the ground, includes two separate co-planar coils positioned above a core formed from a material of high magnetic permeability, such as ferrite. Furthermore, there may be a conductive back plate below the magnetic core acting as a shield and an additional flux shaper. In this arrangement, there is no straight path through the core that passes through the coils. As such, if particularly driven with currents in opposite sense, this coil arrangement, referred to as a 'Double D' arrangement, produces two distinct magnetic pole areas and lines of magnetic flux arc between them in the form of a "flux pipe" above the coils, a zone of high flux concentration called the functional space of the IPT system. The magnetic moment that is generated by this structure is substantially horizontal as opposed to that of a planar single coil structure called a 'Circular' pad, which is substantially vertical.

In accordance with various embodiments described herein, three or more coils may also be used in the coil arrangement of the receiver (pick-up) device. The receiver device is also referred to herein as a vehicle pad. The first two coils may be separate co-planar coils forming a 'Double D' as in the base coil arrangement. During energy transfer, this 'Double D' is aligned with the 'Double D' in the transmitter (base) device. The third coil, referred to herein as a 'Quadrature' coil, is positioned centrally above the 'Double D' on the same side of the magnetically permeable core. The 'Quadrature' coil allows power to be extracted from the vertical component of the magnetic field intercepted by the receiver device in addition to the horizontal component, which is extracted by the 'Double D.' As for a solenoid coil structure, the 'Double D' has tolerance to misalignment between the transmitter and receiver devices in the direction perpendicular to their magnetic moment but less tolerance to misalignment in the direction parallel to their magnetic moment. The triple coil arrangement built of a 'Double D' (DD) and a 'Quadrature' (Q) in the vehicle pad may improve the tolerance of the IPT system in the parallel direction, thus increasing the overall tolerance of the system to misalignment in any direction.

One aspect of embodiments described herein are directed to coil structures that improve the ability to achieve low emission levels (e.g., EMF exposure levels below ICNIRP '98 reference levels or radio frequency interference levels e.g., below limits as defined by European Norm EN 300330 or FCC part 15) while performing charging of electric vehicles. For example, certain embodiments may achieve low emission levels, even where a vehicle underbody is metallic and/or includes a metallic shield and/or if ground structure includes electrically well conducting materials e.g., ferrous bars in a ferroconcrete ground.

Horizontal planar conductive structures above the vehicle pad and below the base pad generally may not substantially suppress magnetic fields at some positions where people may be located in normal use cases. In contrast, they may act as a magnetic flux channel increasing the magnetic flux density at these locations, if compared to a system operated in absence of such conductive structures.

As opposed to a 'circular' single coil pad, the conductive back plate and any extension thereof that may surround the magnetic structure of the pad such as disclosed in US publication No. US 2010/0109604 or other conductive surface such as the vehicle steel underbody or any other additional underbody shielding or conductive ground structure may not help to suppress emission levels at critical locations except in the vehicles interior (passenger compartment). This may related to the magnetic field boundary conditions. Magnetic field components perpendicular to a well conductive surface do not substantially exist. They are cancelled by the induced eddy currents (Lenz law).

To effectively cancel horizontal flux splaying out beneath the vehicle, vertical conductive shields may be used. If mounted at bottom of the vehicle, such shielding may require mechanical means for retraction (e.g., flaps, metal skirts), which may be considered impractical, unreliable, too expensive, and unaesthetic.

'Circular' pads may have the potential for low emissions, in accordance with various embodiments described herein. The base pad 302 and vehicle pad 316 of FIG. 3 shows one example of 'circular' configurations. Furthermore, 'Double D' or solenoid coil structures (not shown) on magnetic cores may provide more tolerance to alignment offset and thus more degree of freedom for vehicle parking.

Low emission levels may be provided by substantially perfectly aligned 'Circular' pads (e.g., a coaxial coil arrangement) providing high degree of symmetry. Any asymmetry e.g., due to alignment offset may generate a horizontal magnetic moment that may not be cancelled by the shielding structure and may increase emissions as measured in the surrounding of the vehicle.

Figure 4:
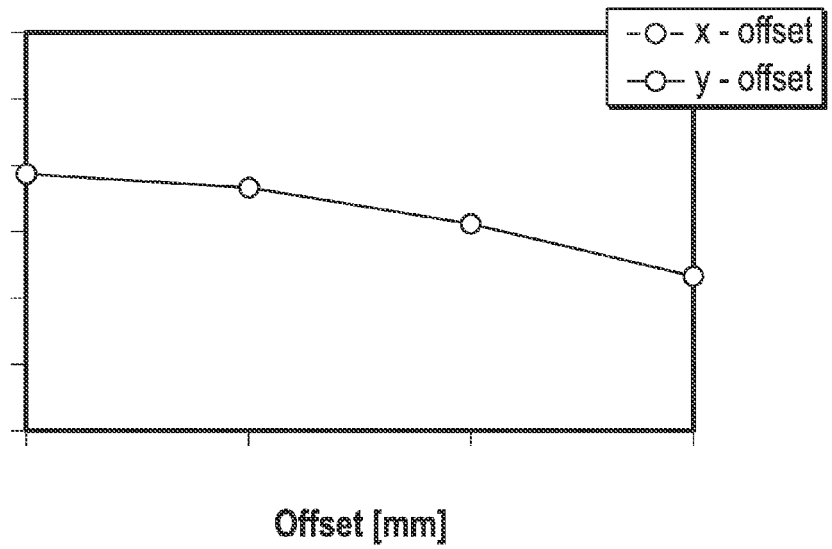
FIG. 4 is a plot illustrating exemplary values of a coupling coefficient k as a function of an alignment offset in x- and y-direction in accordance with the embodiment of the pads of FIG. 3.

FIG. 4 is a plot illustrating exemplary values of a coupling coefficient k as a function of an alignment offset in x- and y-direction in accordance with the embodiment of the pads 302 and 314 shown in FIG. 3. FIG. 4 illustrates an exemplary relationship between the coupling coefficient k and an alignment offset for a given air gap height defined as the base pad surface-to-vehicle pad surface. The air gap height may take into account some thickness for the enclosure of the pads 302 and 314. FIG. 4 illustrates that a relatively fast decay of coupling may occur with increasing offset in x- and y-direction. This behavior may be at least in part a result of the circular coil geometry as shown in FIG. 3.

Figure 5:
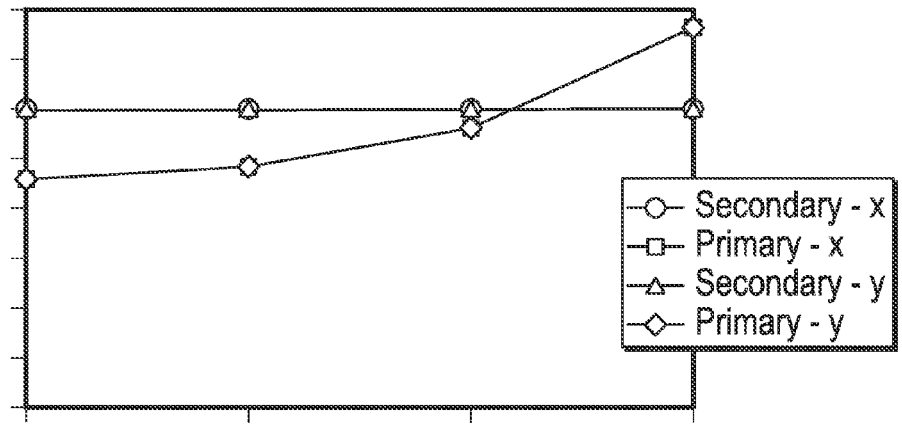
FIG. 5 is a plot illustrating exemplary values of primary current variation as a function of an offset in the x- and y-direction in accordance with the embodiment of the pads of FIG. 3.

FIG. 5 is a plot illustrating exemplary values of primary current variation as a function of an offset in the x- and y-direction in accordance with the embodiment of the pads 302 and 314 shown in FIG. 3. The values shown in FIG. 5 assume a constant power delivered to the load, a constant secondary-side load voltage (electric vehicle battery), and a non-adaptive wireless power receiver using a simple passive rectifier for reasons of circuit complexity and cost, so that the secondary resonant current remains substantially constant over the desired x and y offset range. FIG. 5 illustrates that primary current variation may vary significantly based at least in part on alignment of coils for the circular coil geometry as shown in FIG. 3. For example, as an exemplary value, FIG. 5 illustrates a current variation of about 40% for an particular offset radius, defining the normalized primary current variation as $$\alpha_1 = 100 \cdot \left(1 - \frac{I_{1,min}}{I_{1,max}}\right)$$

Figure 6:
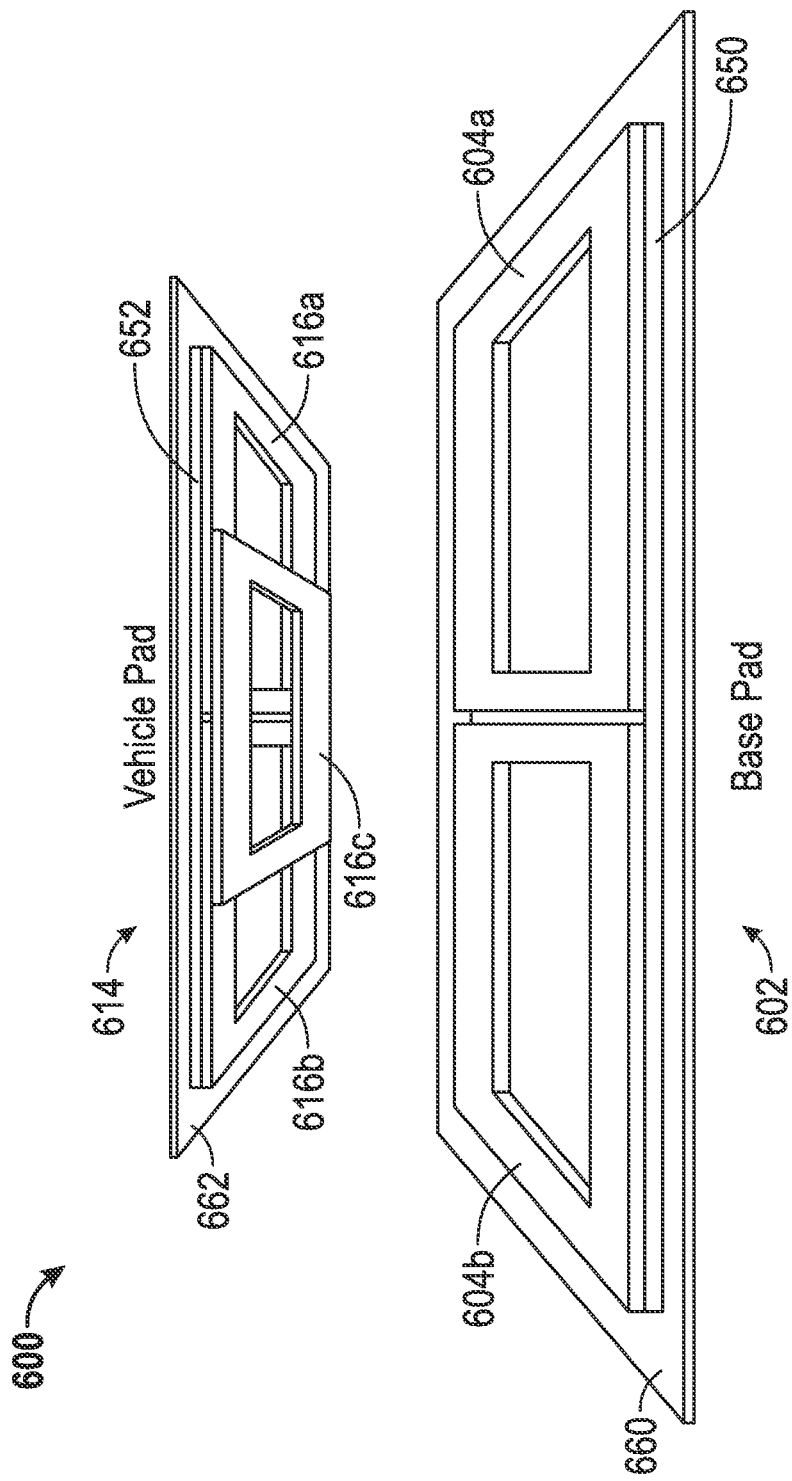
FIG. 6 is a perspective view of a charging system including a vehicle pad arranged above a base pad, in accordance with an embodiment.

FIG. 6 is a perspective view of a charging system 600 including a vehicle pad 614 arranged above a base pad 602, in accordance with an embodiment. The base pad 602 includes a conductive back plate 660 (e.g., shield) and a magnetic material 650 (e.g., ferrite structure). A 'Double D' coil (hereinafter referred to as 'DD-coil') comprises coils 604b and 604a (hereinafter referred to as DD-coil 604a-b with reference to FIG. 6) that rest substantially directly on the magnetic material 650 of the base pad 602. The DD-coil 604a-b may be formed of two loops 616a and 616b each enclosing a respective area. In accordance with embodiments, the DD-coil 604a-b may be formed of either separate coils 616a and 616b or a single conductive structure such as any conductive material wound or formed in such a way as to comprise two loops enclosing respective areas. The vehicle pad 614 also includes a conductive back plate (e.g., shield) 662 and a magnetic material 652. The vehicle pad 614 includes a DD-coil 616a and 616b (hereinafter referred to as DD-coil 616a-b) that is positioned directly on the magnetic material 652. The vehicle pad 614 further includes an additional coil 616c. When used in addition to the DD-coil 616a-b, the coil 616c may be referred to as a 'Quadrature' coil (hereinafter referred to as 'Q-coil'). In some embodiments, the coil 616c is further referred to as a 'circular' coil when wound to enclose a single area. Q-coil 616c is positioned on the DD-coil 616a-b. As shown in FIG. 6, a width of the Q-coil 616c is substantially the same as the width of the magnetic material 652. The length of the Q-coil 616c is substantially shorter than the length of the magnetic material 652.

Emission levels and misalignment tolerance may be fundamentally related. Achieving minimum emissions and high tolerance at the same time may be difficult. This may be considered as a dilemma of inductive power transfer under tight emission constraints.

However, according to embodiments described below, there may be an acceptable trade-off between emissions and tolerance. In an embodiment, a 'circular' coil structure (e.g., Q-coil 616c of FIG. 6) may be used that is supported in offset conditions when positioned particularly with respect to a second coil structure that generates a substantially horizontal magnetic moment. This second arrangement may be a DD-coil (e.g., DD-coil 616a-b of FIG. 6) that may be a part of the base pad or of the vehicle pad or of both. Operating as a receiver, this second structure extracts the horizontal component of the magnetic flux that intercepts the energy receiving pad. Configured as a wireless power transmitter, this second coil arrangement generates a magnetic field that allows energy be extracted by a 'circular' coil of the wireless power receiver in offset conditions.

A pad using a Q-coil 616c a DD-coil 616a-b may be referred to a DDQ-type of pad. A pad 662 that can generate both a vertical and horizontal magnetic moment or that can pick-up both a vertical and horizontal flux component may be referred to herein as a cross-polar pad as it supports both a vertical and a horizontal polarization.

Figure 7:
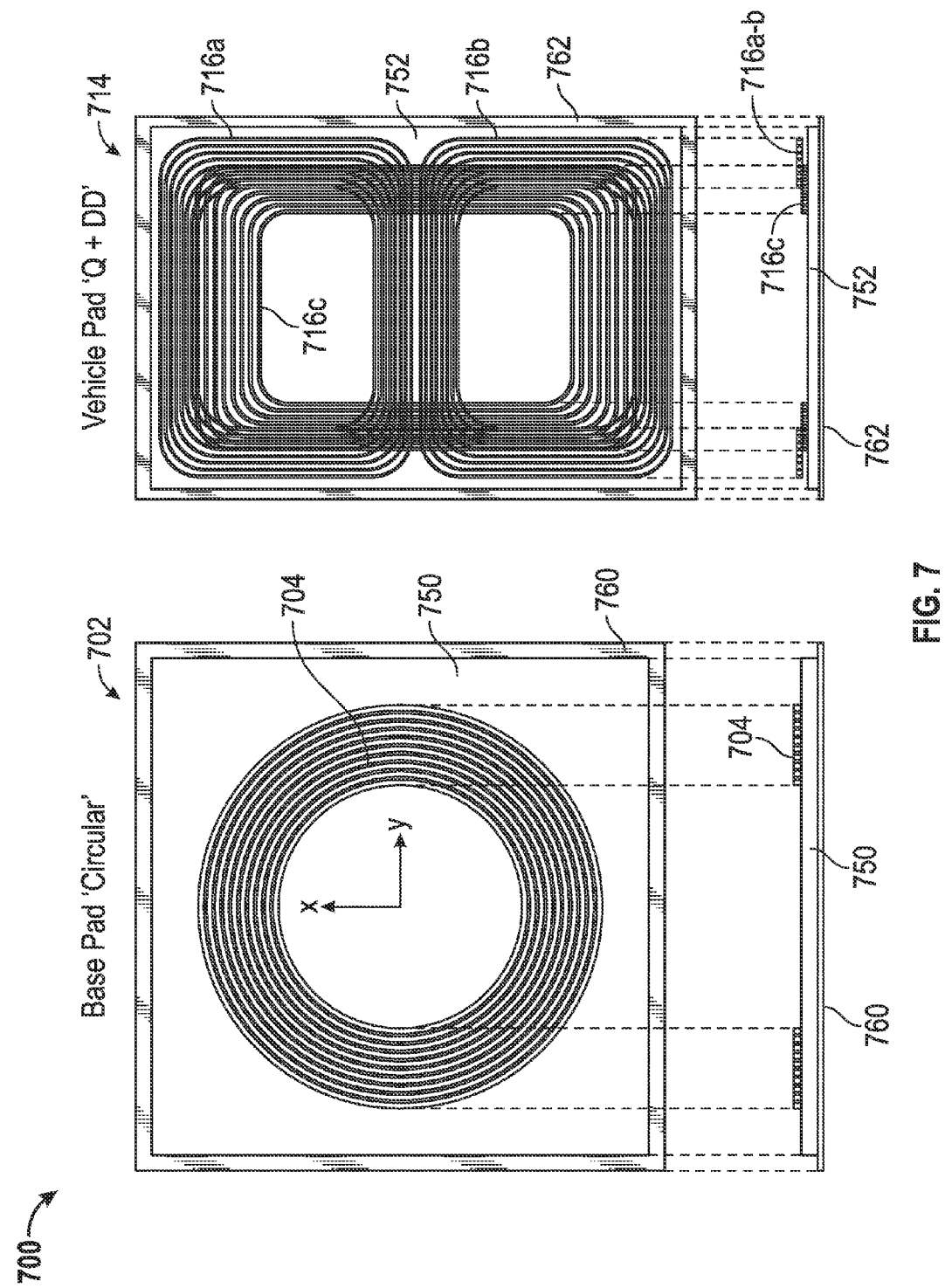
FIG. 7 is a top and profile view of an inductive power transfer system including an exemplary embodiment of a base pad and a vehicle pad, in accordance with an embodiment.

FIG. 7 is a top and profile view of an exemplary inductive power transfer system 700 including a base pad 702 and a vehicle pad 714, in accordance with an embodiment. The base pad 702 comprises a coil 704 having a 'circular' geometry positioned above a magnetic material 750 (e.g., ferrite structure). The magnetic material 750 is positioned above a conductive back plate 760. The vehicle pad 714 also includes a conductive back plate 762. The vehicle pad 714 is a cross-polar pad and is configured to pick-up both a vertical and horizontal flux component and supports both a vertical and horizontal polarization. To this effect, the vehicle pad 714 includes a DD-coil 716a-b and a Q-coil 716c. The Q-coil 716c is positioned between the magnetic material 752 and the DD-coil 716a-b. In accordance with embodiments, the DD-coil 716a-b may be formed of either separate coils 716a and 716b or a single conductive structure such as a single coil wound to include two loops 716a and 716b enclosing respective areas.

Since emissions from a horizontally polarized magnetic structure (e.g., the DD-coil 716a-b) tend to be more significant, the use of the horizontally polarized magnetic structure (e.g., the DD-coil 716c) may be a 'gap filler' to enhance/ boost system performance in offset conditions where coupling in a purely vertically polarized system typically degrades. This may be accomplished by adequately dimensioning of the coils and by controlling the pad currents such that the resulting stray magnetic fields are minimized at points of interest, in accordance with the embodiments described herein. Since an emphasis may be on the 'circular' or Q-coil 716c rather than on the DD-coil 716a-b (assuming a DDQ-type of pad), corresponding embodiments described herein are referred to a QDD-pad.

At least one benefit from a cross-polar arrangement (e.g., the vehicle pad coils 716a-b and 716c) may be smaller pad current variation resulting in less stress and thus lower losses in power conversion if power delivered to the load is maintained constant in all offset conditions within the specified tolerance range. Otherwise stated, by using a cross-polar coil arrangement, variations in operational or loaded Quality-factor (hereinafter Q-factor) of the system may be reduced and/or minimized rendering the system more robust to detuning and loss effects as they may occur in a real environment of a vehicle or ground installation. The use of a cross-polar magnetic structure (e.g., the vehicle pad coils 716a-b and 716c) may avoid use or relax requirements of additional lossy circuitry for adaptive impedance tuning and matching. By using a cross-polar approach, such extra circuitry may be reserved e.g., mainly for the purposes of adapting the system to different air gap heights and/or different loading conditions as resulting from a vehicle battery changing its voltage over the charge cycle. In accordance with the embodiments described with reference to FIGS. 3-7 and otherwise herein, the term 'circular' coil may be used for a single coil structure of any geometry that generates a substantially vertically polarized magnetic moment. A 'circular' coil may have e.g., a circular, square or substantially rectangular geometry. The term 'circular' pad may be used for any pad that integrates a 'circular' coil. A 'circular' pad as well as its shield member and its magnetic core member may have e.g., a circular, square or rectangular geometry.

In accordance with the embodiments described with reference to FIGS. 3-7 and otherwise herein, the term 'Double D' or 'DD' may be used to designate a double coil structure and may be configured to generate a substantially horizontally polarized magnetic moment.

In accordance with the embodiments described with reference to FIGS. 3-7 and otherwise herein, the term 'DDQ' or 'QDD' is used herein to describe a triple coil arrangement that is configured to generate both a vertically and horizontally polarized magnetic moment.

In accordance with the embodiments described with reference to FIGS. 3-7 and otherwise herein, the term 'monolithic' is used herein to describe a magnetic core structure that is composed of at least one block of a high permeability magnetic material e.g., ferrite, wherein in case of a plurality of blocks (e.g., Ferrite tiles), gaps between blocks are small relative to the size of the blocks e.g., <10% of their length and <10% of their width so that the structure excerpts a similar effect as a true monolithic structure.

As described above, the base pad 702 of FIG. 7 comprises a 'circular' coil configuration while the vehicle pad 714 is a 'QDD'-type of vehicle pad having a Q-coil 716c and a DD-coil 716a-b, in accordance with an exemplary embodiment. FIG. 7 further shows a coordinate system (x, y).

The vehicle pad 714 is configured such that the emphasis is on the Q-coil 716c rather than on the DD-coil 716a-b. This is expressed at least by the following exemplary properties. First, the area of the Q-coil 716c is larger relative to the pad area (for example as compared to the Q-coil 616c shown in FIG. 6). In an embodiment, the larger area of the Q-coil 716c relative to the pad area is defined by a vertical position substantially directly adjacent to the magnetic core (see profile in FIG. 7) both increasing inductance, native Q-factor, and coupling. Second, the width of the Q-coil 716c is reduced relative to the width of the magnetic core 752 (e.g., the width of the Q-coil 716c is less than the width of the magnetic core 752). In an aspect, the reduced width of the Q-coil 716c reduces losses in the conductive back plate 762 and in any conductive structure that may surround the vehicle pad 714 (e.g., back plate 762 and the vehicle steel underbody), which in turn increases the coil's native Q-factor. Third, the Q-coil 716c is positioned between the magnetic core 752 and the DD-coil 716a-b. The DD-coil 716a-b sits on top of the Q-coil 716c distant by at least the thickness of the Q-coil 716c from the magnetic core 752. In an aspect, this positioning at least in part compromises the performance of the DD-coil 716a-b coil in favor of the Q-coil 716c.

Systems relying mainly on a DD-coil configuration may generally benefit from a relatively strong coupling. 'Circular'-based systems generally may experience weaker coupling, therefore having coil structures optimized also in terms of native Q-factor, given that efficiency is a function of the product of coupling coefficient and the geometric mean of the primary and secondary Q-factor. This may lead to different geometries and above distinctive features.

Figure 8:
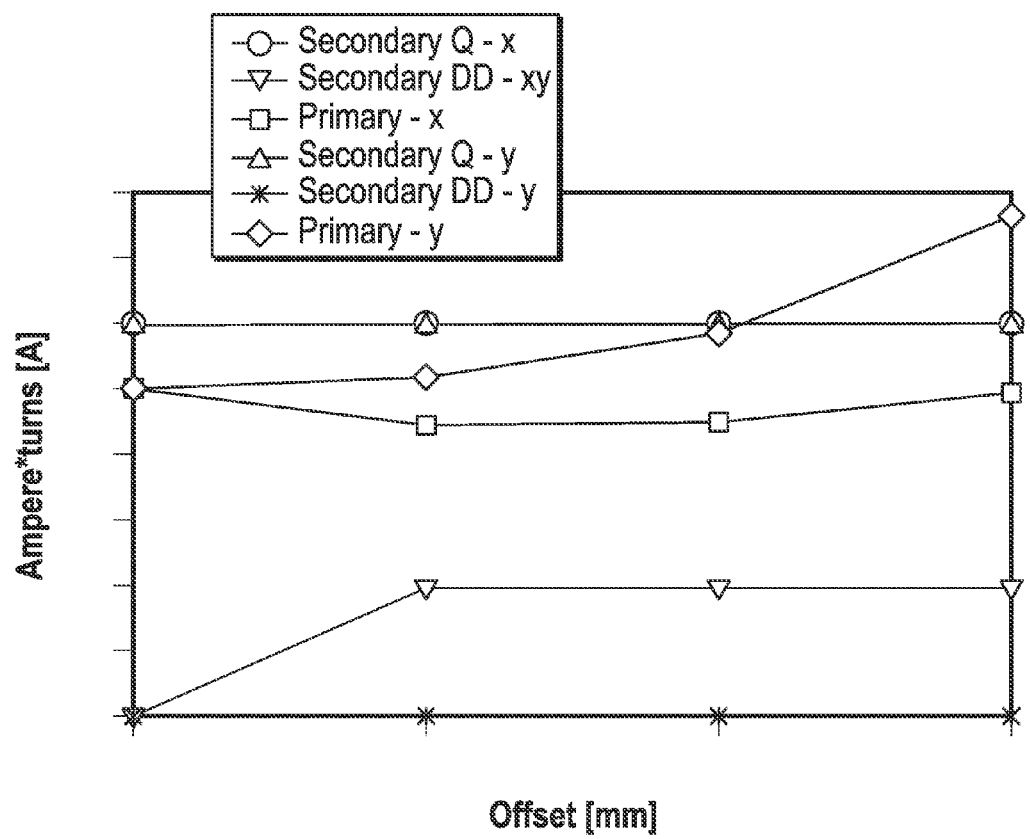
FIG. 8 is a plot of exemplary values of primary current variation as a function of an alignment offset for the base and vehicle pads of FIG. 7.

FIG. 8 is a plot of exemplary values of primary current variation as a function of an alignment offset of base and vehicle pads 702 and 714 of FIG. 7. As in FIG. 5, the values illustrate exemplary primary current variation based on the assumption that, when active, the resonant currents of both the DD-coil 716a-b and Q-coil 716c stay substantially constant over the desired x- and y-offset range and that the DD-coil 716a-b is active only for x-offsets substantially greater than a threshold.

For smaller x-offsets, the DD-coil 716a-b may be assumed in certain embodiments to be deactivated or decoupled so that there is substantially no current on the DD-coil 716a-b. The exemplary values shown in FIG. 8 assumes that the DD-coil 716a-b is deactivated. In certain embodiments, the DD-coil 716a-b is selectively decoupled based on the alignment offset. Selective decoupling of the DD-coil 716a-b based on the alignment offset generally improves efficiency at those offset points where the DD-coil 716a-b cannot contribute substantially to the overall energy transfer. It is noted that in accordance with embodiments described herein, either the Q-coil 716c or the DD-coil 716a-b may be selectively deactivated based on coupling measurements. For example as just noted, in a situation where the DD-coil 716a-b cannot contribute substantially to the overall energy transfer, other losses when activated may reduce overall efficiency. As such, efficiency may be increased by de-activating the DD-coil 716a-b in this situation. It is noted that given the above assumptions, currents of both Q-coil 716c and DD-coil 716a-b (thus power losses) stay substantially constant as well, independently of their contribution to power transfer. Therefore, coil decoupling may be considered an effective way to optimize efficiency. Instead of hard decoupling, soft combining or soft coupling of the two coil configurations, the Q-coil 716c and the DD-coil 716a-b, may be provided. In such case, power contribution by each coil 716c and 716a-b may be controlled individually by selectively adapting the load resistance as seen for example at each rectifier input e.g., using a controlled rectifier e.g., a synchronous rectifier.

FIG. 8 illustrates the effect of the DD-coil 716a-b of FIG. 7 substantially reducing primary current variation in the x-offset direction to on the order of 10% in accordance with one exemplary embodiment, anticipating that the system may cope with x-offsets exceeding 150 mm or more or with an asymmetric offset tolerance requirement (e.g., an elliptical tolerance area rather than a circular). The overall current variation for an equal tolerance requirement in x- and y-direction may be similar with respect to the overall current variation with respect to that of the pad configuration of FIG. 7.

Figure 9:
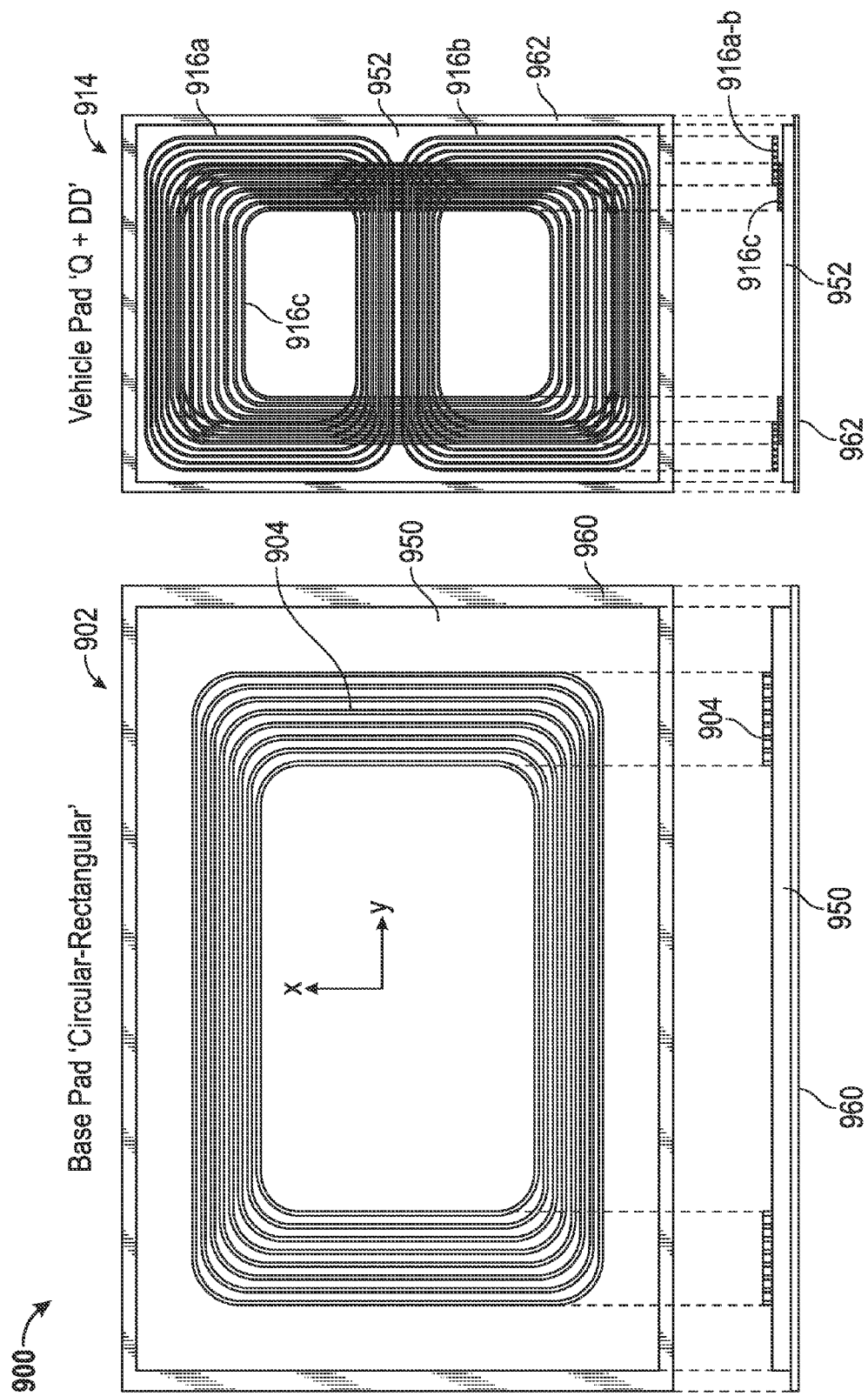
FIG. 9 is a top and profile view of an exemplary inductive power transfer system including a base pad and a vehicle pad, in accordance with an embodiment.

FIG. 9 is a top and profile view of an exemplary inductive power transfer system 900 including another embodiment of a base pad 902 and a vehicle pad 914, in accordance with an embodiment. FIG. 9 further shows a definition of a coordinate system (x, y). The vehicle pad 914 is configured similarly as the vehicle pad 714 of FIG. 7 and includes a Q-coil 916c positioned between a magnetic material 952 (e.g., ferrite structure) and a DD-coil 916a-b. The base pad 902 shown in FIG. 9 is of a 'circular' base pad configuration with a rectangular form factor. The base pad 902 is slightly larger in length but significantly smaller in width and in area compared to the 'circular' pad of FIG. 3 and FIG. 7, and the 'QDD'-pad of FIG. 6. The base pad 902 includes a coil 904 have a substantially rectangular geometry positioned above a magnetic material 950. The magnetic material 950 is positioned above a conductive back plate 960. The magnetic material 950 and the conductive back plate 960 have rectangular geometries. In some aspects, the 'circular-rectangular' base pad 902 shown in FIG. 9 may have improved performance with respect to primary current variation with respect to pad configuration of FIG. 7.

As described above, the DD-coil 916a-b is configured to wirelessly receive power via a magnetic field. The DD-coil 916a-b has a length greater than a width and includes a first portion of electrically conductive material wound to enclose a first area having a first center point and a second portion of electrically conductive material wound to enclose a second area having a second center point. The first and second portions have lower surfaces that are substantially co-planar. The DD-coil 916a-b has a first edge and a second edge each intersecting a geometric line along the length of the DD-coil 916a-b. The Q-coil 916c is positioned between the DD-coil 916a-b and a magnetic material (e.g., the magnetic material 950 or other material having similar properties to a magnetic material 950). The Q-coil 916c is further configured to wirelessly receive power via a magnetic field. The Q-coil 916c comprises electrically conductive material wound to enclose a third area having a third center point. The Q-coil 916c further has a length greater than a width. The length of the Q-coil 916c is substantially equal to at least a distance along the geometric line between the first edge and the second edge of the DD-coil 916a-b.

Figure 10:
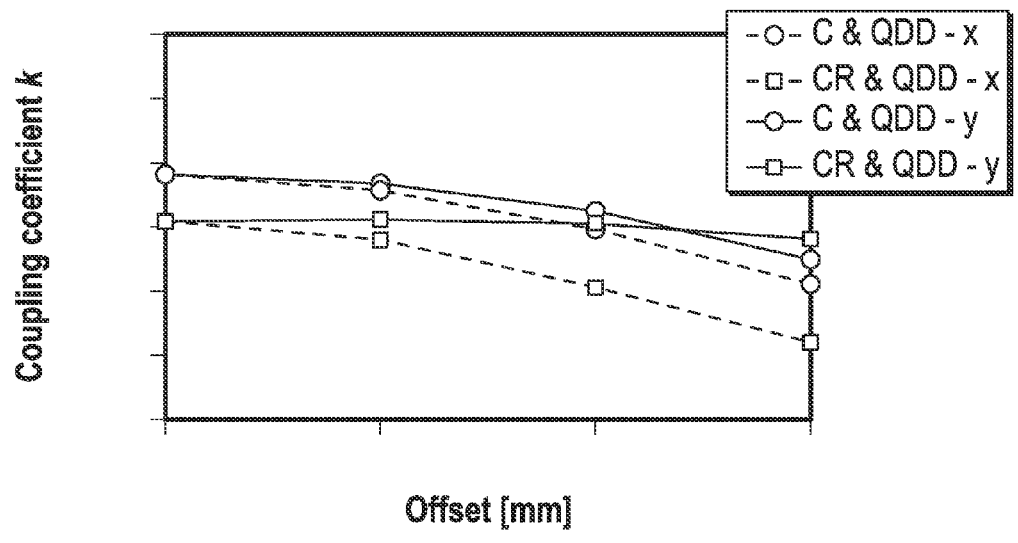
FIG. 10 is a plot illustrating exemplary values of a coupling coefficient k as a function of an alignment offset in the x- and y-direction in accordance with the pads of FIGS. 7 and 9.

FIG. 10 is a plot illustrating exemplary values of a coupling coefficient k as a function of an alignment offset in the x- and y-direction in accordance with the pad configurations of FIGS. 7 and 9. FIG. 10 illustrates the effect of the rectangular shape of the base pad 902 of FIG. 9 by comparing coupling between base pad 902 and both the Q-coil 716c of the 'QDD' vehicle pad 714 for the pad configuration of FIG. 7 (i.e., 'circular' and 'QDD') and the Q-coil 916c of FIG. 9 ('circular-rectangular' and 'QDD'). Whilst coupling coefficient may decay similarly for x- and y-offsets for the pad configuration of FIG. 7 there is a substantially flat course in y-direction and a faster decay in x-direction for the pad configuration of FIG. 9 using the rectangular-shaped base pad 902. As shown by these exemplary values, the behavior matches advantageously with a 'QDD'-arrangement on the vehicle side, if the axis of polarization of the DD-coil 916a-b is substantially perpendicularly oriented to the longer axis of the base pad 902, in accordance with FIG. 9. In the configuration of FIG. 9, the DD-coil 916a-b compensates for the faster decay of coupling in x-direction, whilst there is no need for any compensation in the y-direction.

Figure 11:
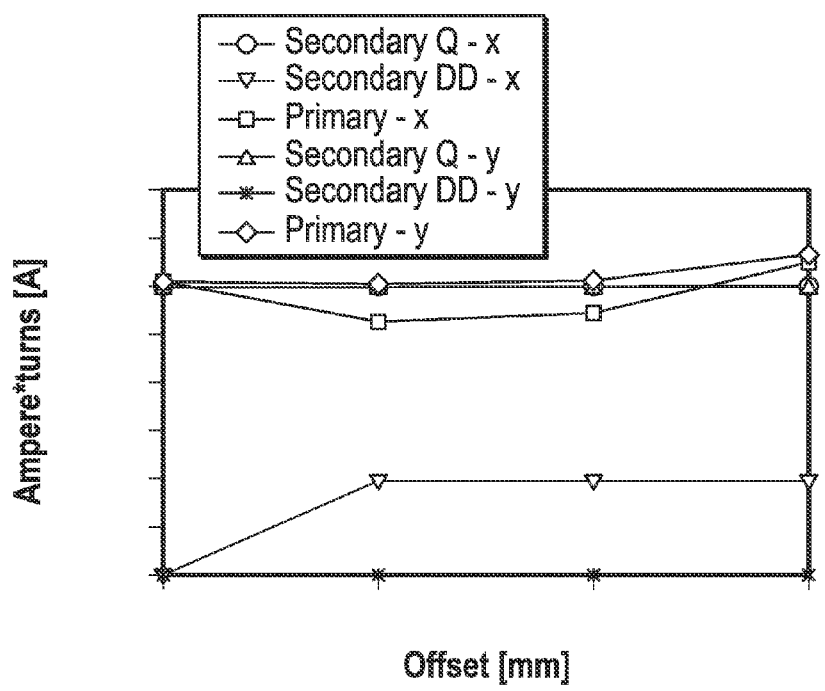
FIG. 11 is a plot of exemplary values of primary current variation as a function of an alignment offset of base and vehicle pads and of FIG. 9.

FIG. 11 is a plot of exemplary values of primary current variation as a function of an alignment offset of base and vehicle pads 902 and 914 of FIG. 9. Again, it is assumed that the secondary-side resonant currents stay substantially constant over the desired x- and y-offset range and that the DD-coil 916a-b is used only for x-offsets greater than a threshold. As described above with reference to FIG. 7, for smaller x-offsets, it may be assumed in certain embodiments that the DD-coil 916a-b may be deactivated so that there is substantially no current on the DD-coil 916a-b. In FIG. 11, the DD-coil 916a-b is assumed to be deactivated for x-offsets smaller than a threshold. FIG. 11 illustrates an exemplary total primary current variation due to horizontal pad misalignment may be on the order of 20% according to one embodiment, which may be on the order of half of that achievable with a pad configuration, for example, similar to that shown in FIG. 3 in some situations.

The 'QDD' arrangement as shown in the vehicle pads 714 and 914 shown in FIGS. 7 and 9 provides some degree of freedom in the current configuration, which may be used to control emissions as measured e.g., along the rim of a vehicle or in particular magnetic field 'hot spots' which are considered critical for the safety of the system. Emission control may be accomplished by changing a relative amplitude and/or phase of a current of one of the coils 916a, 916b, or 916c. Using current control, exposure levels can be substantially reduced e.g., to achieve ICNIRP '98 compliance with respect to reference levels.

In some embodiments, the relative direction (relative phase) of the currents in the Q-coil 916c and in the DD-coil 916a-b is chosen to reduce magnetic field strength at a worst case position ('hot spot').

Figure 12A:
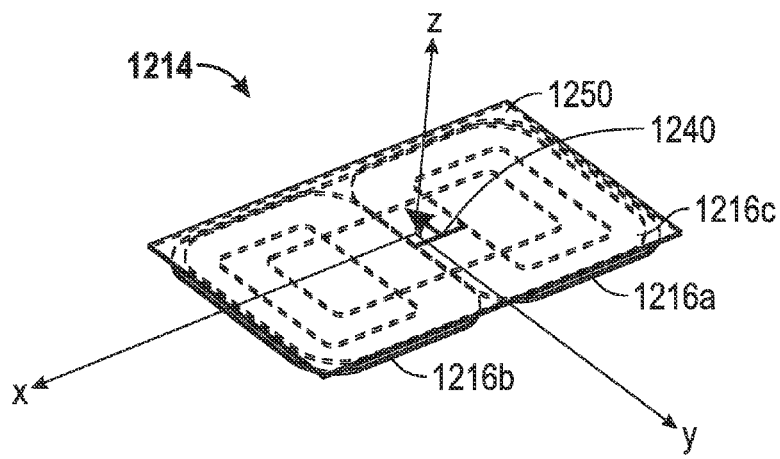
FIGS. 12A, 12B, and 12C are diagrams of exemplary pads showing exemplary current flow configurations for a Q-coil and a DD-coil according to the pad of FIG. 9.
Figure 12B:
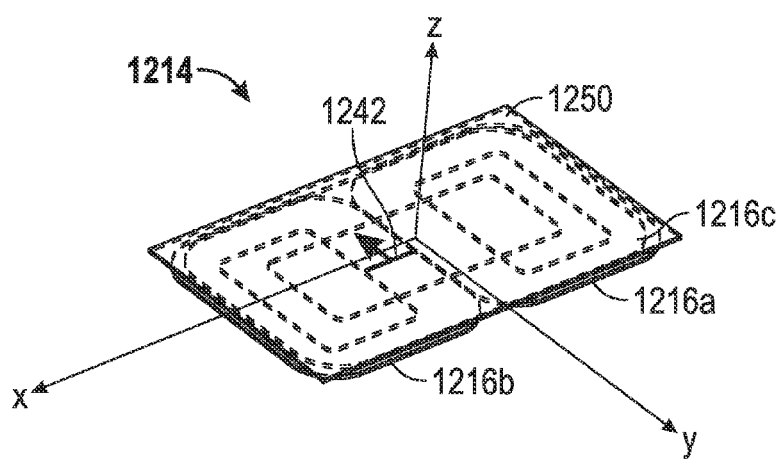
Figure 12C:
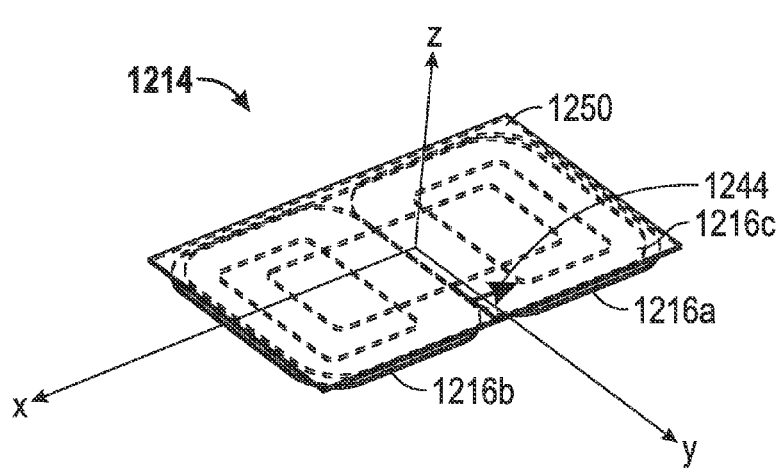

FIGS. 12A, 12B, and 12C are diagrams of exemplary pads 1214 (e.g., corresponding to the vehicle pad 914 of FIG. 9) showing exemplary current flow for a Q-coil 1216c and the DD-coil 1216a-b. The pads 1214 include a Q-coil 1216c that is positioned between a magnetic material 1250 (e.g., ferrite structure) and a DD-coil 1216a-b. FIG. 12A shows an arrow 1240 that indicates a relative current direction with respect to a position for one of the coils 1216a of the DD-coil 1216a-b. FIG. 12B shows an arrow 1242 that indicates a relative current direction with respect to position for the other coil 1216b of the DD-coil 1216a-b. FIG. 12C shows an arrow 1244 that indicates a relative current direction with respect to the Q-coil 1216c of a pad. It is noted that the coil configurations shown in FIGS. 12A, 12B, and 12C may be used for either a vehicle pad or base pad.

Though currents are alternating with high frequency, a current direction in a relative sense may be assigned to each coil 1216a, 1216b, and 1216c, e.g., the polarity of the induced voltage.

In one embodiment, emissions may be reduced by using fixed connections of the coils' terminals to the power converters. It is noted that polarity of a DD-coil 1216a-b and thus current direction changes its sign (180 degrees change of phase) relative to the Q-coil 1216c when the vehicle pad is moved in x-direction from a negative offset to a positive offset, since coupling coefficient will change its sign. This effect may work collaboratively as the field hot spot (maximum) may also move e.g., from the left side of the vehicle 112 (FIG. 1) to the right side of the vehicle 112 requiring relative direction of currents to be reversed for minimum field strength.

In another embodiment, current direction may be dynamically altered by changing polarity of the induction coils 1216a, 1216b, or 1216c using a reverser switch.

As already described above, current control in a 'QDD' coil arrangement may be also employed for reducing power losses.

Figure 13:
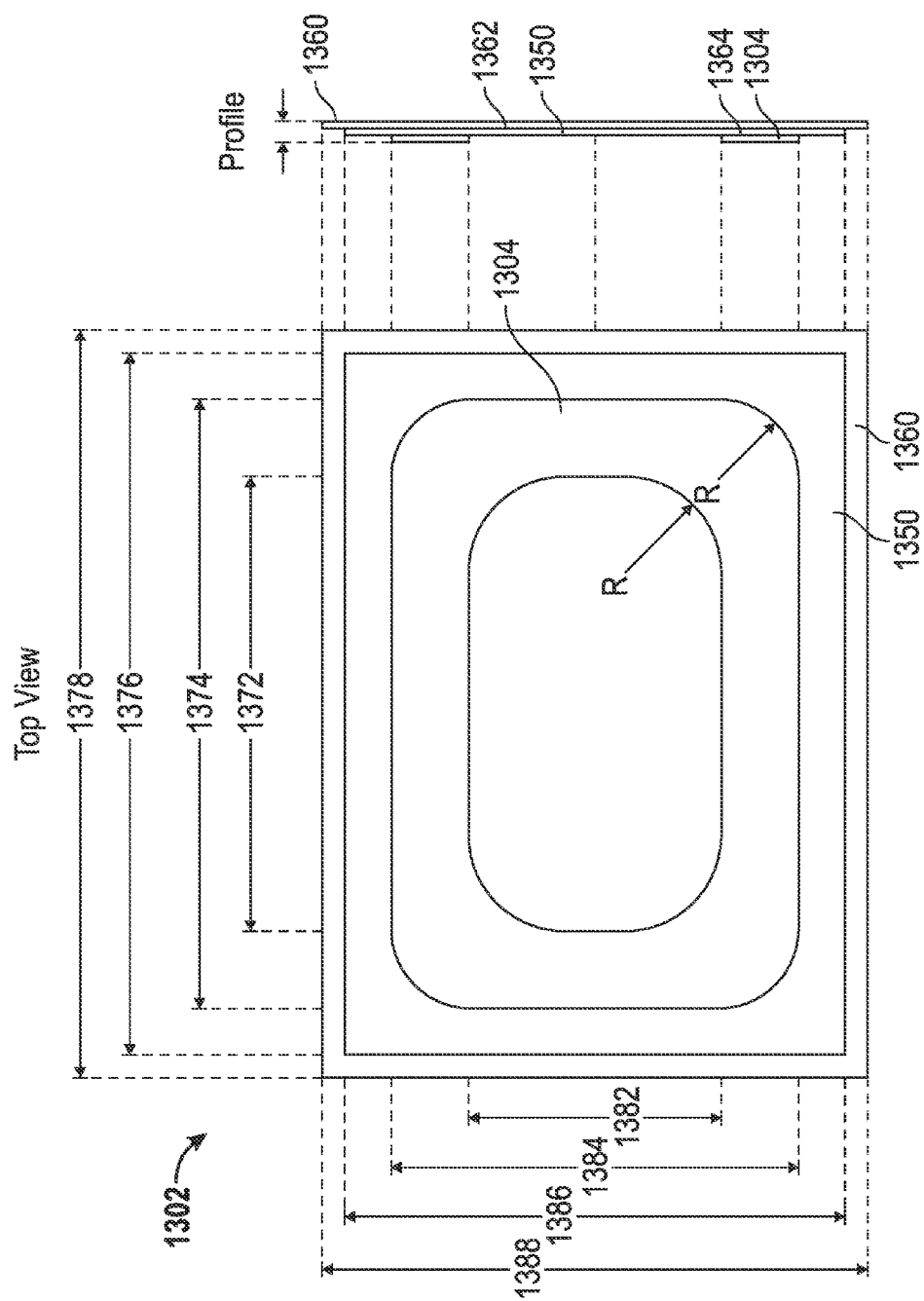
FIG. 13 is a top and profile view of an exemplary embodiment of a wireless power transfer pad, in accordance with an embodiment.

FIG. 13 is a top and profile view of an exemplary embodiment of a pad 1302, in accordance with an embodiment. While the pad 1302 may be configured as a base or vehicle pad, the pad 1302 may be particularly configured for use as a base pad in accordance with an embodiment. FIG. 13 shows the structure of a 'circular-rectangular' pad 1302 (e.g., similarly as described above with reference to the base pad 902 of FIG. 9) in accordance with an embodiment, and shows some of the dimensions that may be defined and configured for the pad 1302. The longer side of the rectangular pad 1302 may be referred to as the length. The shorter side of the pad 1302 is therefore referred to as the width. The pad 1302 includes a coil 1304 having a rectangular geometry. In accordance with an embodiment, the coil 1304 may be formed from Litz wire coil. The coil 1304 has an outer length that is defined by dimension 1374 and an inner length defined by dimension 1372. Furthermore, the coil 1304 has an outer width defined by dimension 1384 and an inner width defined by dimension 1382. The coil 1304 is positioned above a magnetic material 1350 (e.g., ferrite structure) having a length defined by dimension 1376 and a width defined by dimension 1386. The magnetic material 1350 is positioned above a conductive back plate 1360 having a length defined by dimension 1378 and a width defined by dimension 1388. In addition, the pad 1302 may include a first insulating layer 1362 between the conductive shield 1360 and the magnetic material 1350. The pad 1302 may also include an insulating layer 1364 between the magnetic material 1350 and the coil 1350.

Figure 14:
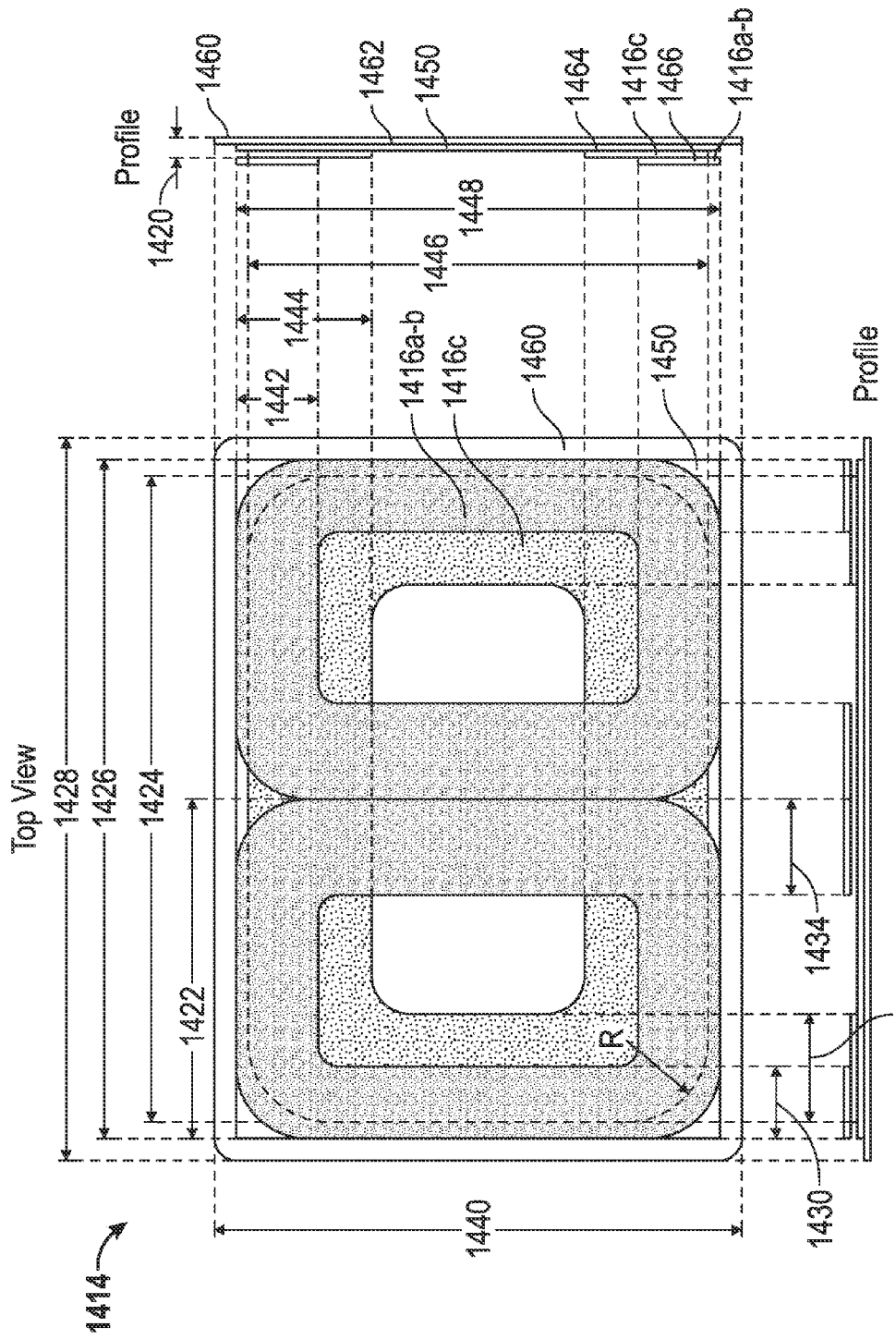
FIG. 14 is a top and profile view of another exemplary wireless power transfer pad, in accordance with an embodiment.

FIG. 14 is a top and profile view of an exemplary embodiment of a pad 1414, in accordance with an embodiment. While the pad 1414 may be configured as a base or vehicle pad, the pad 1414 may be particularly configured for use as a vehicle pad in accordance with an embodiment. FIG. 14 shows an embodiment of the structure of a 'QDD'-type of pad 1414 (similar to the vehicle pad 914 of FIG. 9) in accordance with an exemplary embodiment, and shows some of the dimensions that may be defined and configured for the pad 1414. The longer side of the rectangular pad 1414 may be referred to as the length. The shorter side of the pad 1414 is therefore referred to as the width. The pad 1414 includes a Q-coil 1416c having a rectangular geometry. In accordance with an embodiment, the coil 1416c may be formed from Litz wire coil. The Q-coil 1416c may be a conductive structure comprising conductive material configured to be wound to enclose an inner portion having a center point. The length of the Q-coil 1416c is defined by dimension 1424 and the width of the Q-coil 1416c is defined by dimension 1446. In addition, a distance along the length of the Q-coil 1416c of an edge of the Q-coil 1416 along the length to an edge of an inner region is defined by dimension 1432. A distance along the width of the Q-coil 1416c of an edge of the Q-coil 1416 along the width to an edge of the inner region is defined by dimension 1444.

The Q-coil 1415c is positioned between a DD-coil 1416a-b and a magnetic material 1450 (e.g., ferrite structure). The DD-coil 1416a-b may be considered to have at least two loops of conductive material wound to enclose two inner regions having two center points. The length of each portion of the DD-coil 1416a-b is defined by dimension 1422. The width of each portion of the DD-coil 1416a-b is defined by dimension 1448. In addition, a distance along the length of the DD-coil 1416a-b of an edge of the DD-coil 1416a-b along the length to an edge of an inner region is defined by dimension 1430. A distance along the length of the DD-coil 1416a-b of a point dividing the two portions of the DD-coil 1416a-b and an opposite edge of the inner region is defined by dimension 1434. Furthermore, a distance along the width of the DD-coil 1416a-b of an edge of the DD-coil 1416a-b along the width to an edge of the inner region is defined by dimension 1442. The magnetic material 1450 has a length defined by dimension 1426 and a width defined by dimension 1448. The magnetic material 1450 is positioned above a conductive back plate 1460 having a length defined by dimension 1428 and a width defined by dimension 1440. The center points of each of the conductive back plate 1460, the magnetic material 1450, the Q-coil 1416c, and the DD-coil 1416a-b are aligned. The thickness of the pad 1414 is defined by dimension 1420.

As described above, the DD-coil 1416a-b is configured to wirelessly receive power via a magnetic field. The DD-coil 1416a-b has a length greater than a width and includes a first loop of electrically conductive material wound to enclose a first area having a first center point and a second loop of electrically conductive material wound to enclose a second area having a second center point. The first and second loops have lower surfaces that are substantially co-planar. The DD-coil 1416a-b has a first edge and a second edge each intersecting a geometric line along the length of the DD-coil 1416a-b. The Q-coil 1416c is positioned between the DD-coil 1416a-b and a magnetic material (e.g., the magnetic material 1450 or other material having similar properties to a magnetic material 1450). The Q-coil 1416c is further configured to wirelessly receive power via a magnetic field. The Q-coil 1416c comprises electrically conductive material wound to enclose a third area having a third center point. The Q-coil 1416c further has a length greater than a width. The length of the Q-coil 1416c is substantially equal to at least a distance along the geometric line between the first edge and the second edge of the DD-coil 1416a-b.

The pad 1414 may further include an insulating layer 1462 positioned between the conductive back plate 1460 and the magnetic material 1450. The pad 1414 may further include an insulating layer 1464 positioned between the magnetic material 1450 and the Q-coil 1416c. The pad 1414 may further include an insulating layer 1466 between the Q-coil 1416c and the DD-coil 1416a-b.

Figure 15A:
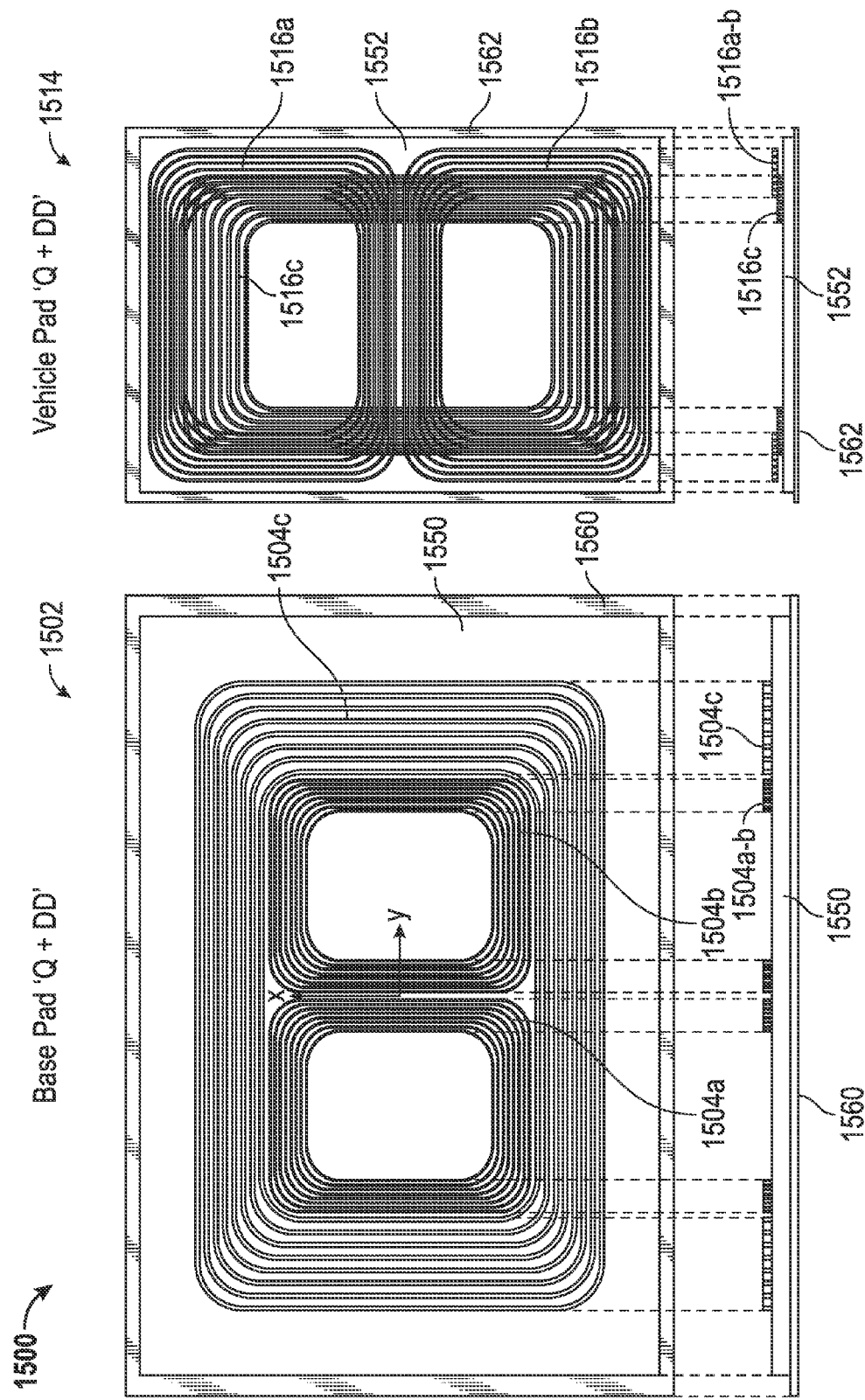
FIG. 15A is a top and profile view of an exemplary inductive power transfer system including a base pad and a vehicle pad, in accordance with an embodiment.

FIG. 15A is a top and profile view of an exemplary inductive power transfer system 1500 including another embodiment of a base pad 1502 and a vehicle pad 1514, in accordance with an embodiment. FIG. 15 further shows a definition of a coordinate system (x, y). The vehicle pad 1514 is configured similarly as the vehicle pad 914 of FIG. 9 and includes a Q-coil 1516c positioned between a magnetic material 1552 (e.g., ferrite structure) and a DD-coil 1516a-b. The pad configuration comprises a 'QDD'-type of base pad 1502 and a 'QDD'-type of vehicle pad 1514. The base pad 1502 includes a DD-coil 1504a-b and a Q-coil 1504c. The DD-coil 1504a is arranged substantially in the same plane as the Q-coil 1504c, using the free space as given by the opening of the Q-coil 1504c. Thus, the overall thickness of the pad remains the same.

In accordance with the coil configuration of FIG. 15A, the performance of the base pad DD-coil 1504a-b is configured to be "compromised" in favor of the Q-coil 1504c, which is in accordance with emphasizing the Q-coil 1504 as described above with reference to FIG. 7. Moreover, the polarization of the magnetic moment of the DD coil 1504a-b is perpendicular relative to the vehicle pad DD-coil 1516a-b. This configuration may provide increased misalignment tolerance and/or flatness of coupling (primary current) vs. offset in y-direction when selectively driven in terms of current amplitude and phase from a dual channel power source.

Figure 15B:
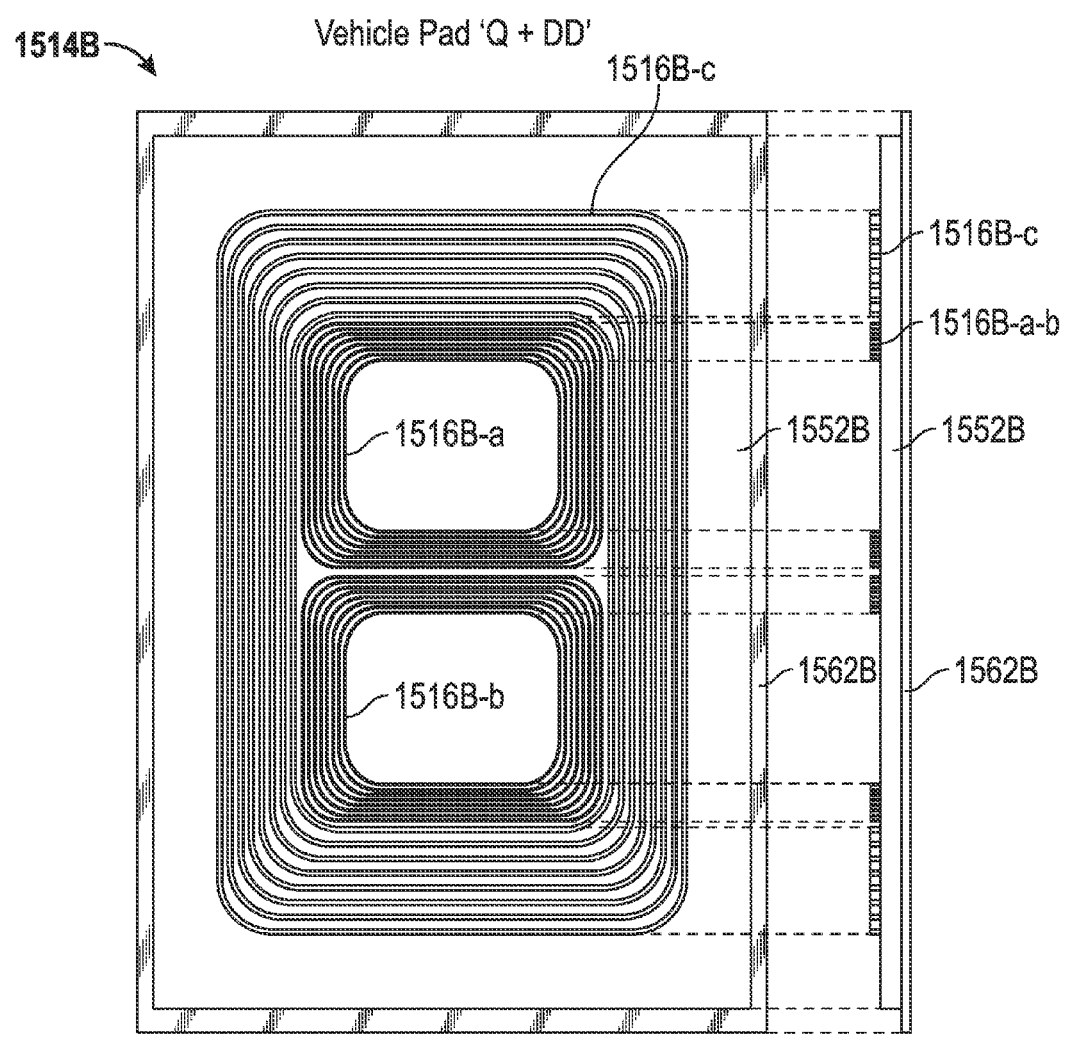
FIG. 15B is a top and profile view of an exemplary vehicle pad that may be used in an inductive power transfer system, in accordance with an embodiment.

FIG. 15B is a top and profile view of an exemplary vehicle pad 1514B that may be used in an inductive power transfer system, in accordance with an embodiment. FIG. 15B shows an example of a vehicle pad 1514B that may be configured similarly as the based pad 1502 of FIG. 15A. For example, the vehicle pad 1514B includes a DD-coil 1516B-a-b and a Q-coil 1516B-c. The DD-coil 1516B-a-b is arranged substantially in the same plane as the Q-coil 1516B-c, using the free space as given by the opening of the Q-coil 1516B-c. The vehicle pad 1514B is configured to wirelessly receive power via a magnetic field generated by any of the base pad configurations described above.

Figure 16:
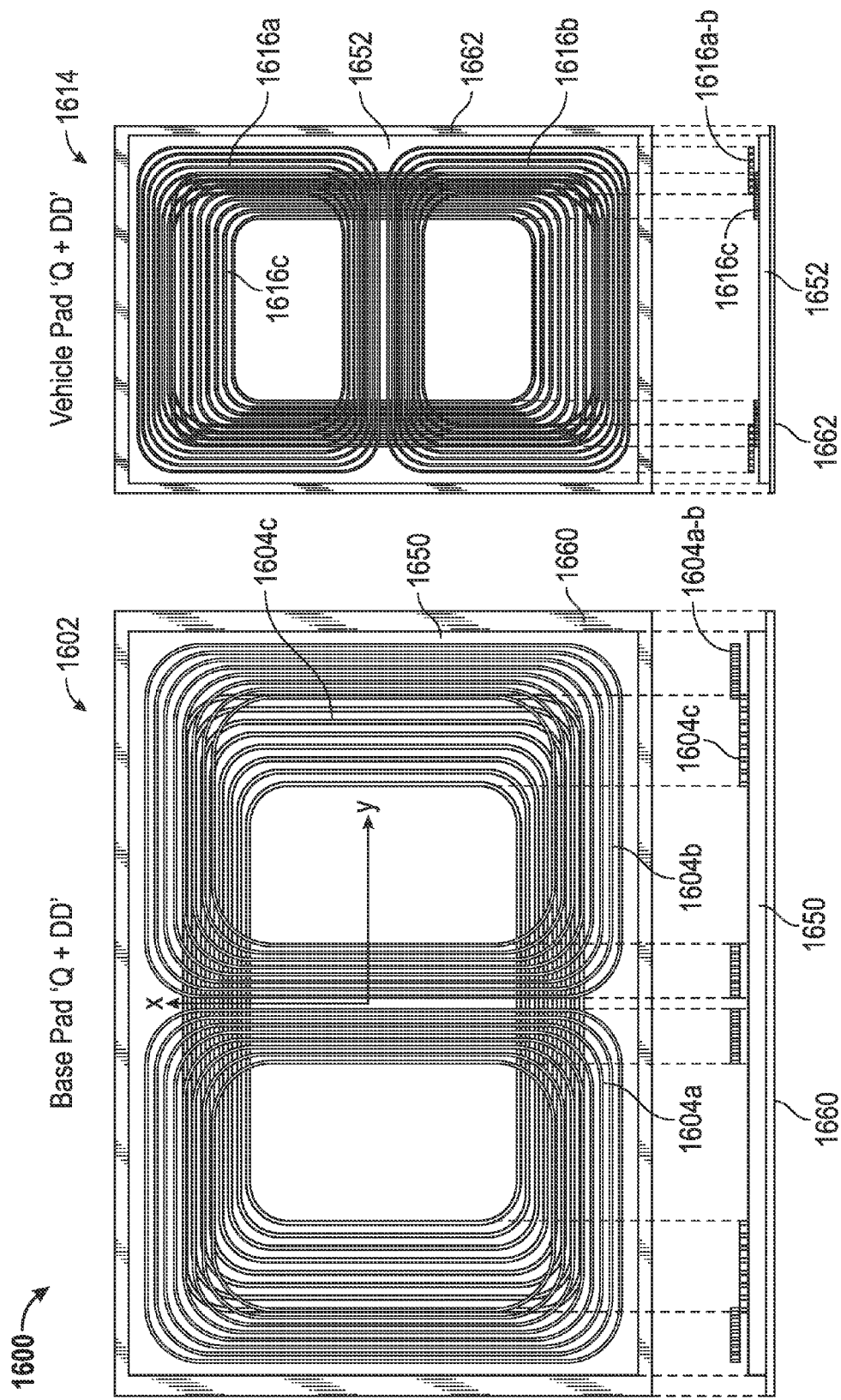
FIG. 16 is a top and profile view of another exemplary inductive power transfer system including a base pad and a vehicle pad, in accordance with an embodiment.

FIG. 16 is a top and profile view of an exemplary inductive power transfer system 1600 including another embodiment of a base pad 1602 and a vehicle pad 1614, in accordance with an embodiment. The vehicle pad 1614 is configured similarly as the vehicle pad 914 of FIG. 9 and includes a Q-coil 1616c positioned between a magnetic material 1652 (e.g., ferrite structure) and a DD-coil 1616a-b. The pad configuration of FIG. 16 includes a 'QDD'-type base pad 1602 and a 'QDD'-type vehicle pad 1604. The base pad 1602 includes a DD-coil 1504a-b and a Q-coil 1504c. Similar to the configuration of the vehicle pad 1614, the base pad Q-coil 1604c is positioned between the DD-coil 1604a-b and the magnetic material 1650. Moreover, as described above, the base pad Q-coil 1604c is larger relative the area of the base pad 1602 such that a length of the Q-coil 1604c spans a length of edges of the DD-coil 1604a-b.

In accordance with the embodiments described with reference to FIGS. 7-16, the pad configurations may be used to meet a desired alignment tolerance in both the x and y direction while allowing for reduced emissions.

In addition, the configurations as described herein may provide for designing a pad to meet a desired alignment tolerance while avoiding significant amounts of simulation for confirmation. Stated another way, using the basic geometry of the pads described above (e.g., with reference to FIGS. 9, 13, 14, 15, and 16) may allow for selecting particular dimensions according to the general geometry that will result in a particular alignment tolerance. If the general geometry of a pad is based on the geometry of the pads described above (e.g., with reference to FIG. 9), significant testing and/or simulation may not be needed to confirm that a desired alignment tolerance is met. This is further described below.

Figure 17:
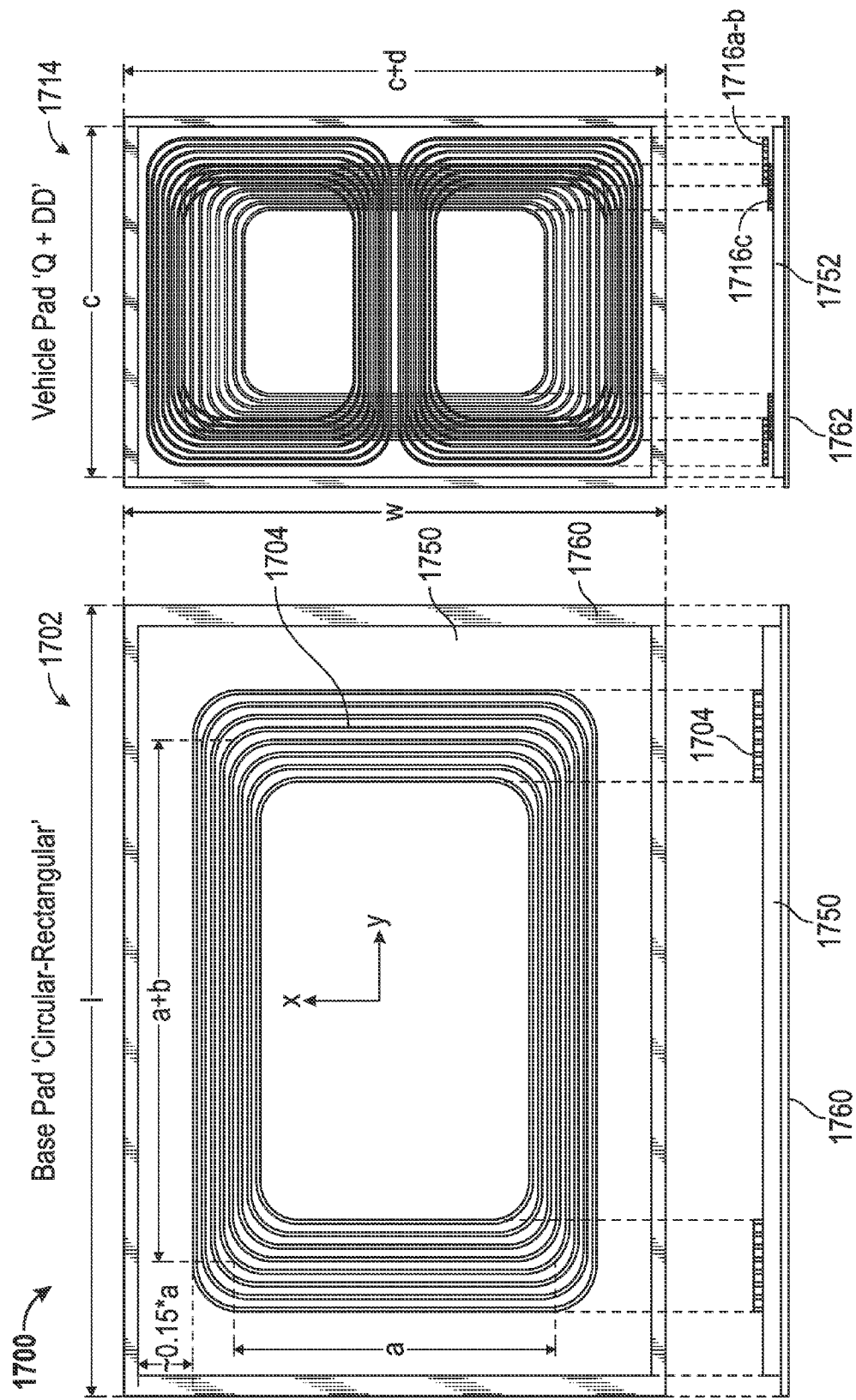
FIG. 17 shows the inductive power transfer system of FIG. 9 with information for dimensioning of the base pad and vehicle pad to achieve a selected alignment tolerance, in accordance with an embodiment.

FIG. 17 shows the inductive power transfer system of FIG. 9 with information for dimensioning of the base pad 1704 and vehicle pad 1714 to achieve a selected alignment tolerance, in accordance with an embodiment. The base pad coil 1704 has a rectangular form factor having a width a. The length of the base pad coil 1704 may be defined by the width a plus a value b. In accordance with an embodiment, the lengths a and b may be chosen such that they substantially satisfy the 'golden' ratio such that:

$$\frac{a}{b} \cong \frac{(a+b)}{a}$$

A particular alignment tolerance may be a function of this dimensioning, such that designing a pad to satisfy this ratio may result in a pad with a predictable alignment tolerance. In addition, in some embodiments, the magnetic material extends beyond rectangular base pad coil by substantially 0.15*a in both dimensions.

The vehicle pad 1714 formed of the Q+DD coils 716a-b and 716c also has a rectangular form factor having a width c and a length defined by c plus another value d. In accordance with an embodiment, the lengths c and d may be chosen such that they substantially satisfy the 'golden' ratio such that $$\frac{c}{d} \cong \frac{(c+d)}{c}$$

Accordingly a vehicle pad 1714 dimensioned per the above ratio may allow for easily determining an alignment tolerance without engaging in significant testing. In some embodiments, the length of the vehicle pad 1714 c+d is substantially equal to the width w of the base pad 1704. As described above, the Q-coil 1716c is positioned directly on the magnetic material (e.g., ≈1 millimeter air gap) where the Q-coil 1716c is about 95% of the size of the magnetic material 1752, while the DD-coil 1716a-b is about the size of the magnetic material 1752.

With reference to FIGS. 7 and 9, for example, embodiments having a base pad 902 with a 'circular' coil 904 (e.g., circular or rectangular form factor enclosing a single area) may allow for low emissions. The 'circular' coil 904 in the base pad 902 generates a vertically polarized magnetic moment with a doughnut shaped stray field that is effectively suppressed by the base pad's metal conductive back plate 960 and by the underbody metal of the vehicle 112 (FIG. 1) or by any additional shield structure. In contrast, the DD or 'solenoid' structure generates a horizontal moment with a leakage field that is "squeezed" out by horizontal metallic surfaces particularly in case of a ferro-concrete ground. Expanding a y-dimension of the 'circular' base pad 902 to form the rectangular form factor may increase alignment offset tolerance in y-direction, but reduces tolerance in x-direction. The shortage in the x-tolerance may then be compensated for, using the supplementary DD-coil 916a-b structure in the vehicle pad 914 (e.g., supplementary to the Q-coil 916c). The DD-coil 916a-b, which may be potentially a source of significant emissions is operated with a reduced ampere-turn, but sufficient for achieving required x-tolerance. The current direction of the DD-coil 916a-b relative to the Q-coil 916c is chosen such that magnetic field components as generated by the Q-coil 916c and DD-coil 916a-b at particular locations (e.g., field "hot spots") tend to substantially cancel out The Q-coil 916c and the DD-coil 916a-b may be positioned such that substantially zero mutual coupling exists between the Q-coil 916c and the DD-coil 916a-b. For example, a time-varying signal in the Q-coil 916c may not substantially induce any voltage in the DD-coil 916a-b as a result of the time-varying signal in the Q-coil 916c. Similarly, a time-varying signal in the DD-coil 916a-b may not substantially induce any voltage in the Q-coil 916a-b as result of the time-varying signal in the DD-coil 916a-b.

In addition, magnetic flux density of the base pad may be lower, e.g., on the order of 30%, as compared to a DD base pad 602 (FIG. 6) that may relax sensitivity requirements foreign objection detection.

Figure 18:
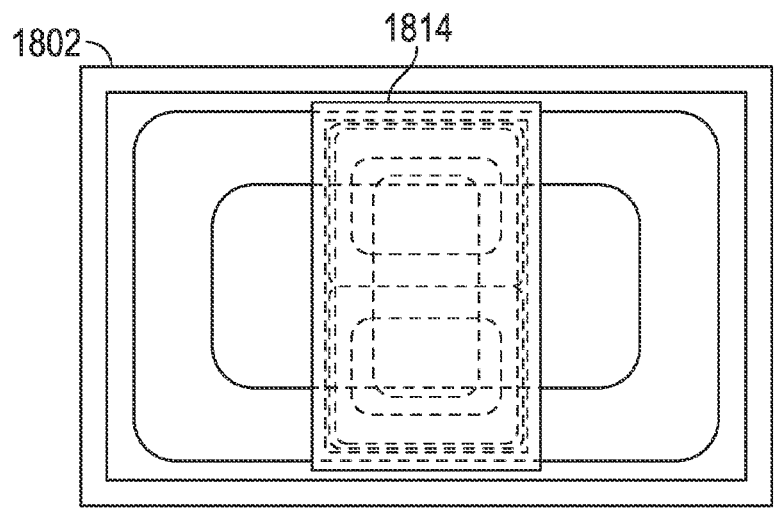
FIG. 18 shows alignment of the vehicle pad of FIG. 9 over the 'circular-rectangular' base pad of FIG. 9.

FIG. 18 shows alignment of a vehicle pad 1814 as in FIG. 9 over a 'circular-rectangular' base pad 1802 as in FIG. 9. In FIG. 18, the DD-Q vehicle pad 1814 is shown aligned over the base pad 1802. As shown, a longitudinal axis of the DD-Q vehicle pad 1814 is perpendicular to the longitudinal axis of the base pad 1802. Stated another way a geometric line running along the length (i.e., longer dimension) of the vehicle pad 1814 is perpendicular to a geometric line running along the length (i.e., longer dimension) of the base pad 1802.

Figure 19:
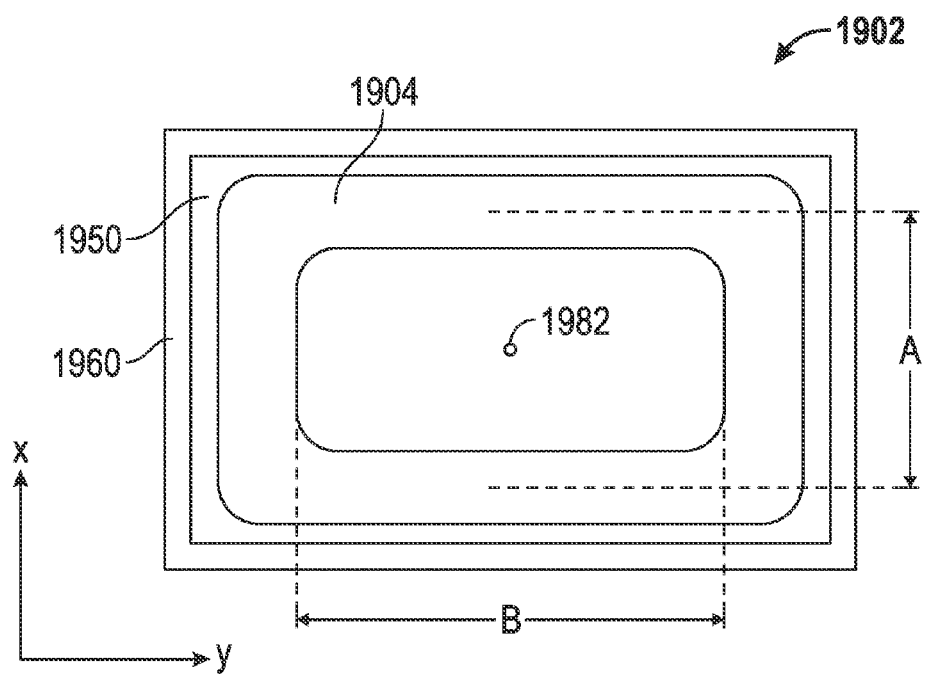
FIG. 19 is a top view of an exemplary base pad of FIG. 9, in accordance with an embodiment.

FIG. 19 is a top view of an exemplary base pad 1902 as in FIG. 9, in accordance with an embodiment. FIG. 19 further illustrates information for dimensioning a base pad 1902 for determining an alignment tolerance. FIG. 19 shows a circular rectangular base pad 1902 having a 'circular-rectangular' coil 1904 positioned above a magnetic material 1950 (e.g., ferrite structure). The magnetic material 1950 is positioned above a conductive back plate 1960. The 'circular-rectangular' coil 1904 has exemplary rectangular dimensions of A from the centers of each side of the coil 1904 along the width. The 'circular-rectangular' coil 1904 further as a dimension of B defining the window length (e.g., length of the area enclosed by the coil 1904) in the y-direction. A center point 1982 is shown collectively defined as the center of a rectangle covering the surface area of the pad 1902.

Figure 20:
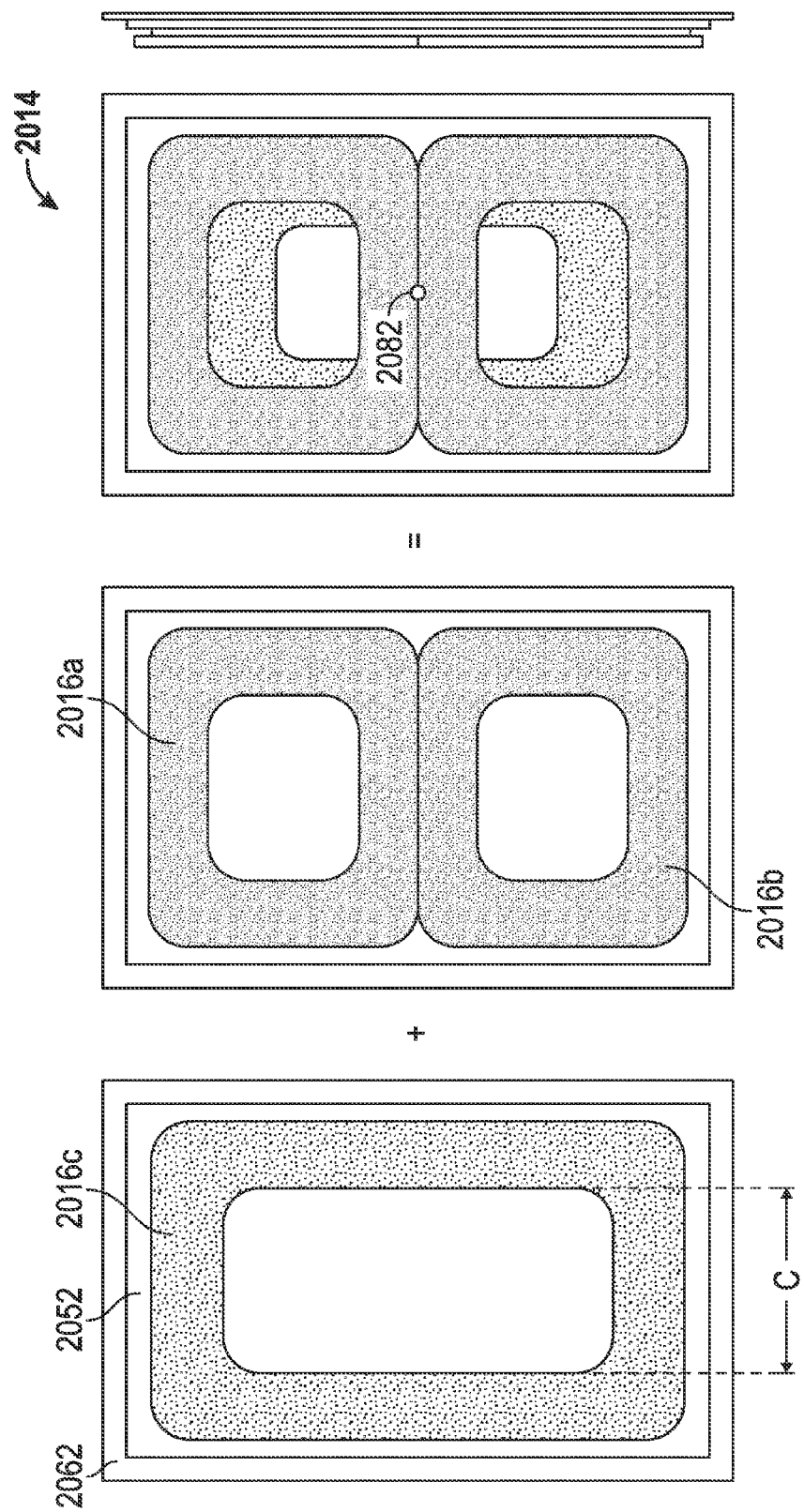
FIG. 20 is a top and profile view of an exemplary vehicle pad of FIG. 9, in accordance with an embodiment.

FIG. 20 is a top and profile view of an exemplary vehicle pad 2014 as in FIG. 9, in accordance with an embodiment. FIG. 20, in conjunction with FIG. 19, further illustrates information for dimensioning a vehicle pad 2104 for determining an alignment tolerance. FIG. 20 shows the layers of a DDQ vehicle pad 2014 with exemplary dimensions to form the rectangular vehicle pad 2014. The vehicle pad includes a conductive back plate 2062 and a magnetic material 2052 (e.g., ferrite structure). In a first layer, a Q-coil 2016c is positioned above the magnetic material 2052. The Q-coil has a rectangular geometry where C defines the width of the window width (e.g., width of area enclosed) of the Q-coil 2016c. In a second layer, a DD-coil 2016a-b is positioned above the Q-coil 2106c. A center point 2082 is shown collectively defined as the center of a rectangle covering the surface area of the pad 2014. As shown, the width of the windows (e.g., areas enclosed by the DD-coil) is at least as wide as the dimension C.

Figure 21A:
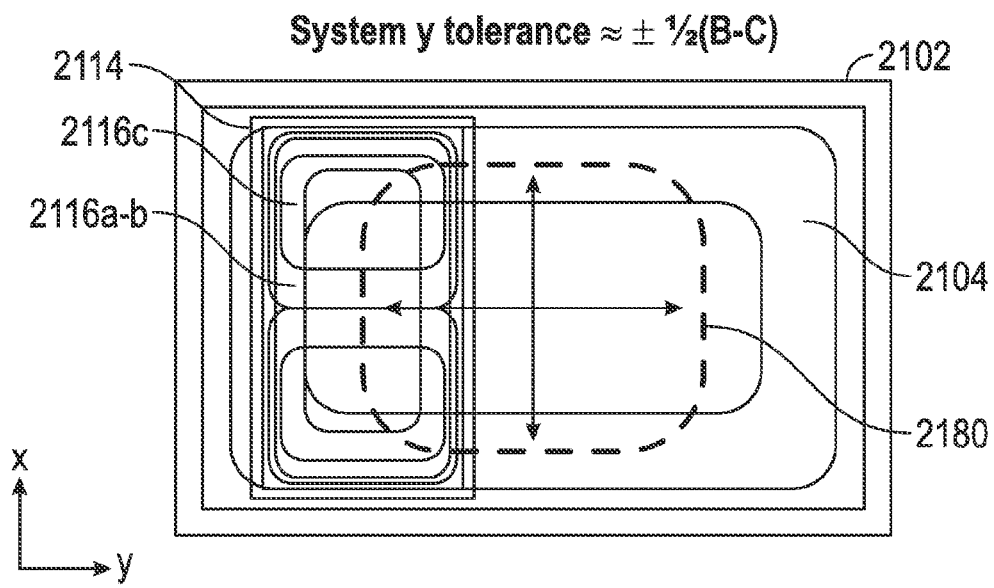
FIGS. 21A and 21B are diagrams illustrating the alignment tolerance of an inductive power transfer system when the vehicle pad of FIG. 20 is aligned over the base pad of FIG. 19.
Figure 21B:
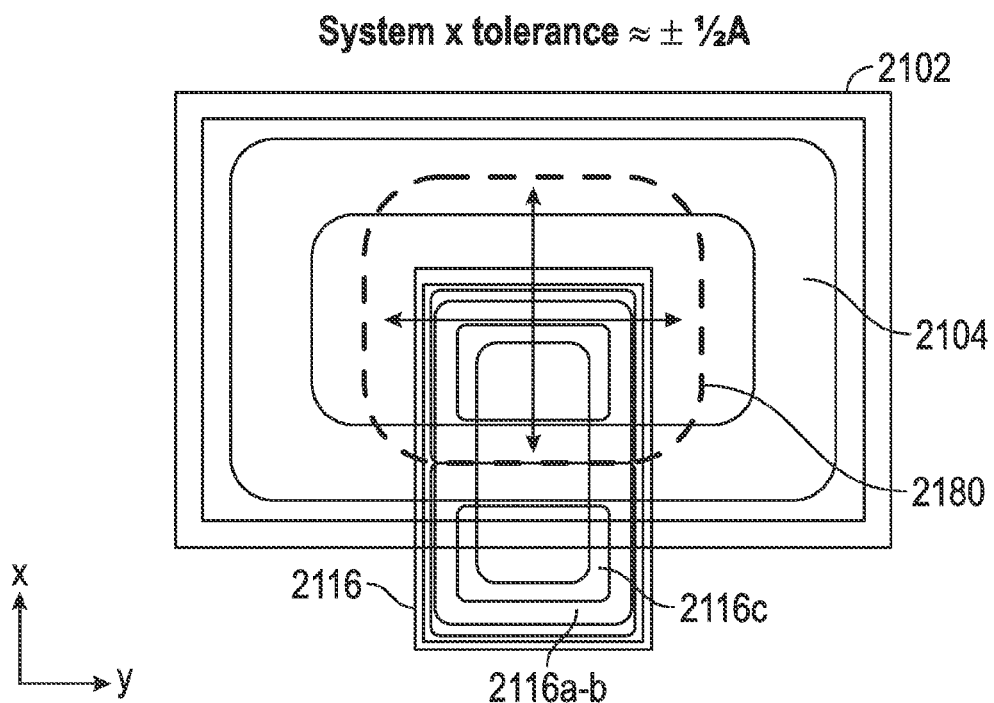

FIGS. 21A and 21B are diagrams illustrating the alignment tolerance of an inductive power transfer system when the vehicle pad 2114 as in FIG. 20 is aligned over the base pad 2102 as in FIG. 19. The region 2180 defined by the arrows shows the alignment tolerance region of the system where sufficient coupling between the coils of the pads 2102 and 2216 is achieved. As indicated in FIG. 21A, according to the dimensions described with respect to FIGS. 19 and 20, the system alignment tolerance when moving in the y-direction is defined by substantially plus or minus one-half multiplied by the value of B-C. In addition, as indicated in FIG. 21B, according to the dimensions described with respect to FIGS. 19 and 20, the system alignment tolerance in the x-direction is be defined by substantially plus or minus one-half multiplied by the value of A. In accordance, by using dimensioning according to the pad configurations described with reference to FIGS. 19 and 20, the alignment tolerance may be readily determined. Significant testing and simulation may not be needed.

Stated another way, the alignment tolerance region 2180 may be defined by a substantially rectangular region. This alignment tolerance region 2180 may correspond to a region in which an amount of power transfer is above a threshold (e.g., coupling between the vehicle pad 2114 and the base pad 2102 is above a threshold). The threshold may correspond to an amount of power sufficient to charge a load in accordance with the embodiments described herein. Stated another way, a set of points, defined by offset distances between a center point 2082 of the vehicle pad and a center point 1982 of the base pad 1902, at which an amount of coupling or an efficiency is above a threshold defines a substantially rectangular region. The amount of coupling may be defined by a value derived from a set of coupling coefficients measuring coupling between the each of the different primary and secondary coil pairs, such that the amount of coupling is a combination of each of the couplings between the different primary and secondary pairs. The efficiency may be defined as the maximum energy transfer efficiency achievable with an optimum use of the multi-coil inductive coupling system. In some implementations, the combination of the couplings may be substantially equivalent to the efficiency. The length of the alignment tolerance region 2180 (e.g., in the y-direction) may be substantially equal to plus or minus one-half multiplied by the difference between dimensions B and C. Furthermore, the width of the alignment tolerance region 2180 (e.g., in the x-direction) may be substantially equal to plus or minus one-half multiplied by the dimension A. In this way, give a target alignment tolerance region 2180, dimensions of the coils of the vehicle pad 2114 and the base pad 2102 that achieve the target alignment tolerance may be easily determined, e.g., without requiring significant testing.

Figure 22A:
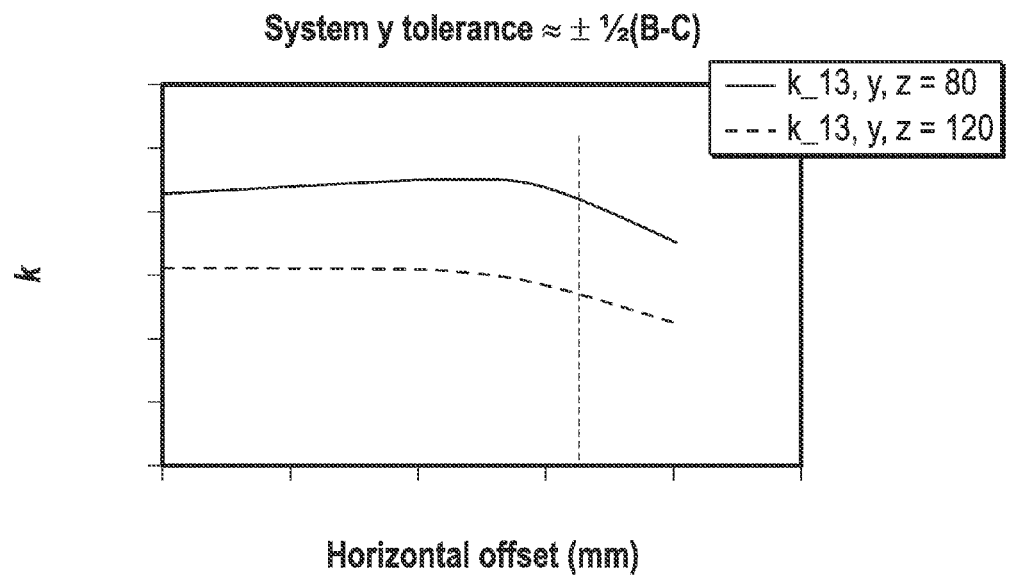
FIG. 22A is a plot of exemplary coupling coefficients k at two different exemplary pad heights as a function of a horizontal offset (y-direction) illustrating a system horizontal alignment tolerance.

FIG. 22A is a plot of exemplary coupling coefficients k at two different exemplary pad heights as a function of a horizontal offset (y-direction) illustrating a system horizontal alignment tolerance. The plot of FIG. 22A may correspond to the coupling coefficients at different heights as the vehicle pad 2102 of FIG. 21A is moved horizontally over the base pad 2102 of FIG. 21B. The coupling coefficients shown may be the coupling coefficients measured between the 'circular-rectangular' coil 2104 of the base pad 2102 and the Q-coil 2116c of the vehicle pad 2102. As described above, in accordance with some embodiments, coupling between the base pad coil 2104 and the DD-coil 2116a-b of the vehicle pad 2102 along the horizontal axis may be negligible, or the DD-coil 2116a-b may be deactivated. The exemplary coupling coefficients illustrate that for horizontal offsets of the pad configurations of FIG. 21A, coupling remains substantially constant over a large range in the y-direction. The vertical line indicates a point at which coupling may fall below a threshold. The system y tolerance may therefore be defined, in one aspect, as a region in which the coupling is above a threshold. The threshold may correspond to sufficient amount of coupling to achieve sufficient power transfer for powering or charging an electric vehicle.

Figure 22B:
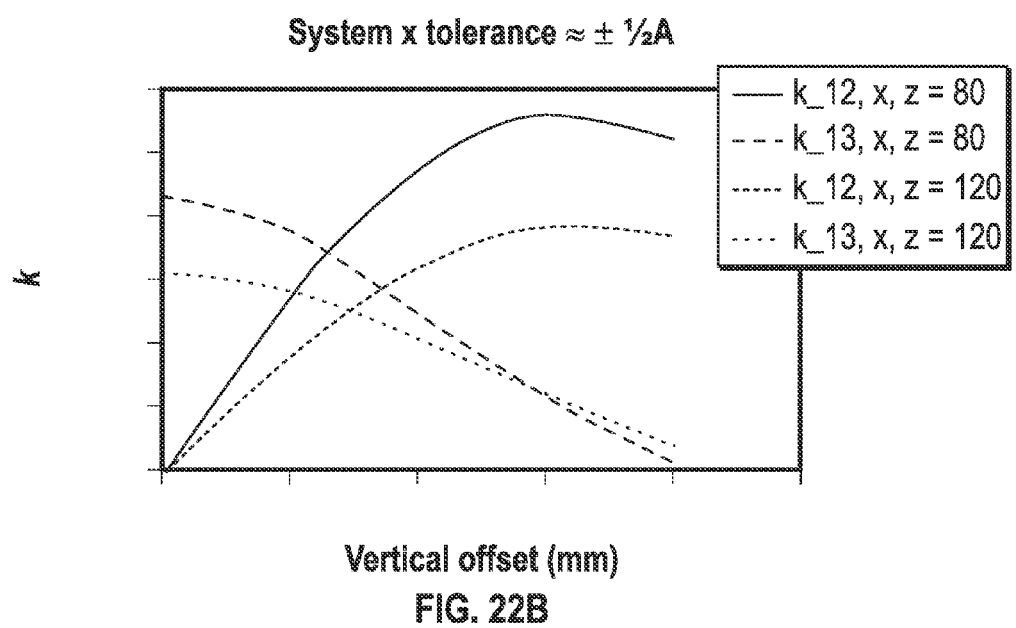
FIG. 22B is a plot of exemplary coupling coefficients k at two different exemplary pad heights as a function of a vertical offset (x-direction) illustrating a system vertical alignment tolerance.

FIG. 22B is a plot of exemplary coupling coefficients k at two different exemplary pad heights as a function of a vertical offset (x-direction) illustrating a system vertical alignment tolerance. The plot of FIG. 22B may correspond to the coupling coefficients at different heights as the vehicle pad 2102 of FIG. 21B is moved vertically (in the x-direction) over the base pad 2102 of FIG. 21B. The coupling coefficients designated as k_12 correspond to coupling between the base pad coil 2104 and the DD-coil 2116a-b of the vehicle pad 2114. As described above, coupling increases between the base pad coil 2104 and the DD-coil 2116a-b when the vehicle pad 2114 moves in the x-direction relative to the base pad 2102. The coupling coefficients designated as k_13 correspond to coupling between the base pad coil 2104 and the Q-coil 2116c of the vehicle pad 2114. As described above, coupling decreases between the base pad coil 2104 and the Q-coil 2116c as the vehicle pad 2114 moves in the x-direction relative to the base pad 2102. For a tolerance region 2180 (FIG. 22B) the combined coupling between the base pad 2102 and the vehicle pad coils 2116a-b and 2116c may be above a threshold as decreases in coupling with the Q-coil 2116c may be offset by increases in coupling with the DD-coil 2216a-b. As such there may be a large offset range in the x-direction in which sufficient coupling for adequate power transfer is above a threshold. In accordance a large alignment tolerance in which coupling between the base pad 2102 and the vehicle pad 2104 remains above a threshold in both the x and y direction is achieved.

As such, in accordance embodiments described, pad configurations are provided that improve mis-alignment tolerance with less total base pad current variation. Moreover, a rectangular or square tolerance region is achieved that may provide significant tolerance in both the x and y directions. Moreover, embodiments are configured to have reduced emissions due, in one aspect, to the vertical flux pole produced by the base pad. In addition, in some embodiments, the size of the base pad may be reduced, particularly in the DD direction. In addition, given the dimensioning described above, the pad configurations may be simpler to customize for different tolerance regions and vehicle configurations. In addition, embodiments may result in lower base pad surface flux density.

In an aspect, the pad configurations as described with reference to FIGS. 7-21 provide high efficiency over a large substantially 'square' tolerance region. Accordingly, configurations described herein may achieve large tolerance regions for alignment with high power transfer efficiency, while reducing emissions.

Figure 23:
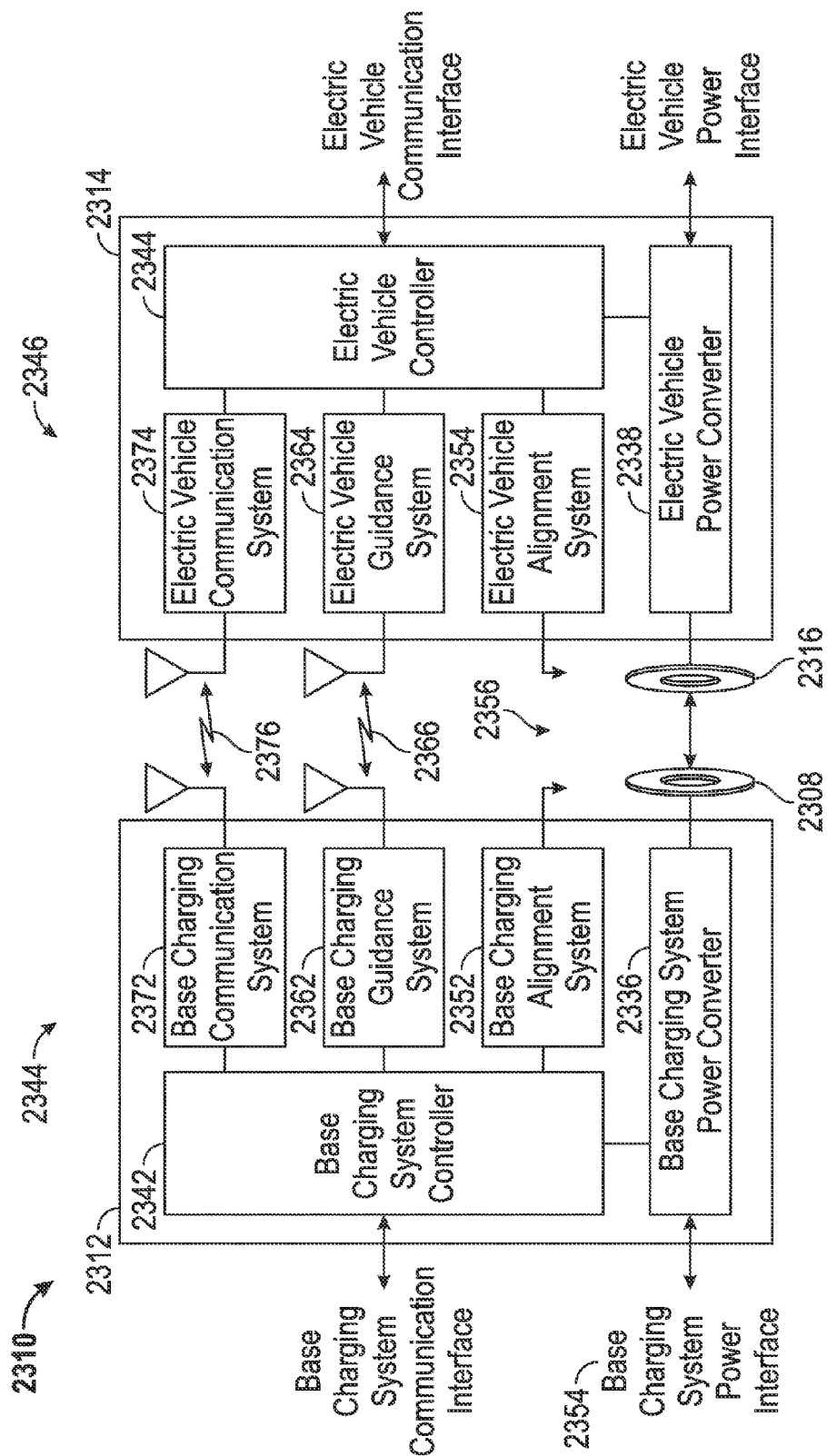
FIG. 23 is another functional block diagram showing exemplary core and ancillary components of the wireless power transfer system of FIG. 1.

FIG. 23 is another functional block diagram showing exemplary core and ancillary components of the wireless power transfer system 100 of FIG. 1. Any of the vehicle or base pads described above may be incorporated into the wireless power transfer system of FIG. 23 or may use any one or more of the components described with reference to FIG. 23. The wireless power transfer system 2310 illustrates a communication link 2376, a guidance link 2366, and alignment systems 2352, 2354 for the base system induction coil 2308 and electric vehicle induction coil 2316. As described above with reference to FIG. 2, and assuming energy flow towards the electric vehicle 112, in FIG. 23 a base charging system power interface 2354 may be configured to provide power to a charging system power converter 2336 from a power source, such as an AC or DC power supply 126. The base charging system power converter 2336 may receive AC or DC power from the base charging system power interface 2354 to excite the base system induction coil 2308 at or near its resonant frequency. The electric vehicle induction coil 2316, when in the near field coupling-mode region, may receive energy from the near field coupling mode region to oscillate at or near the resonant frequency. The electric vehicle power converter 2338 converts the oscillating signal from the electric vehicle induction coil 2316 to a power signal suitable for charging a battery via the electric vehicle power interface.

The base wireless charging system 2312 includes a base charging system controller 2342 and the electric vehicle charging system 2314 includes an electric vehicle controller

2344. The base charging system controller 2342 may include a base charging system communication interface to other systems (not shown) such as, for example, a computer, and a power distribution center, or a smart power grid. The electric vehicle controller 2344 may include an electric vehicle communication interface to other systems (not shown) such as, for example, an on-board computer on the vehicle, other battery charging controller, other electronic systems within the vehicles, and remote electronic systems.

The base charging system controller 2342 and electric vehicle controller 2344 may include subsystems or modules for specific application with separate communication channels. These communications channels may be separate physical channels or separate logical channels. As non-limiting examples, a base charging alignment system 2352 may communicate with an electric vehicle alignment system 2354 through a communication link 2376 to provide a feedback mechanism for more closely aligning the base system induction coil 2308 and electric vehicle induction coil 2316, either autonomously or with operator assistance. Similarly, a base charging guidance system 2362 may communicate with an electric vehicle guidance system 2364 through a guidance link to provide a feedback mechanism to guide an operator in aligning the base system induction coil 2308 and electric vehicle induction coil 2316. In addition, there may be separate general-purpose communication links (e.g., channels) supported by base charging communication system 2372 and electric vehicle communication system 2374 for communicating other information between the base wireless power charging system 2312 and the electric vehicle charging system 2314. This information may include information about electric vehicle characteristics, battery characteristics, charging status, and power capabilities of both the base wireless power charging system 2312 and the electric vehicle charging system 2314, as well as maintenance and diagnostic data for the electric vehicle 112. These communication channels may be separate physical communication channels such as, for example, Bluetooth, zigbee, cellular, etc. These systems may operate to determine and communicate the relative positions and/or the relative orientations of the base system induction coil 2308 and electric vehicle induction coil 2316 in any appropriate manner.

To communicate between a base wireless charging system 2312 and an electric vehicle charging system 2314, the wireless power transfer system 2310 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 2308 and 2316 may also be configured to act as wireless communication transmitters. Thus, some embodiments of the base wireless power charging system 2312 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 2336 may include a load sensing circuit (not shown) for detecting the presence or absence of active electric vehicle receivers in the vicinity of the near field generated by the base system induction coil 2308. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 2342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

FIG. 24 is a flowchart of an implementation of a method 2400 of wirelessly communicating power, in accordance with an embodiment. At block 2402, power is wirelessly received via a first conductive structure via a magnetic field. The first conductive structure has a length greater than a width. The first conductive structure comprises a first loop and a second loop enclosing a first area and a second area, respectively. The first loop has a first lower surface and the second loop has a second lower surface that are substantially coplanar. The first conductive structure has a first edge and a second edge each intersecting a geometric line along the length of the first conductive structure. At block 2404, power is wirelessly received via a second conductive structure positioned between the first conductive structure and a magnetic material. The second conductive structure encloses a third area. The second conductive structure has a length greater than a width, the length of the second conductive structure being substantially equal to at least a distance along the geometric line between the first edge and the second edge of the first conductive structure.

FIG. 25 is a functional block diagram of a wireless power receiver 2500, in accordance with an exemplary embodiment. Wireless power receiver 2500 comprises means 2502 and 2504 for the various actions discussed with respect to FIGS. 1-24.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly communicating power, comprising:
a first conductive structure configured to wirelessly receive power via a magnetic field generated by a base pad having a length greater than a width, the first conductive structure having a length greater than a width, the first conductive structure comprising a first loop and a second loop enclosing a first area and a second area, respectively and the first conductive structure having a first edge and a second edge each intersecting a first geometric line along the length of the first conductive structure; and
a second conductive structure positioned between the first conductive structure and a magnetic material and configured to wirelessly receive power via the magnetic field generated by the base pad, the second conductive structure comprising a third loop enclosing a third area, the second conductive structure having a length greater than a width, the length of the second conductive structure being equal to at least a distance along the first geometric line between the first edge and the second edge of the first conductive structure,
wherein the length of the first conductive structure is disposed substantially parallel to the length of the second conductive structure and substantially perpendicular to the length of the base pad.

2. The apparatus of claim 1, wherein the magnetic material, the first conductive structure, and the second conductive structure are rectangular having lengths aligned along the first geometric line.

3. The apparatus of claim 2, wherein the first conductive structure and the second conductive structure are configured to be positioned over the base pad configured to generate the magnetic field, the base pad being rectangular and having a second geometric line intersecting the length of the base pad that is perpendicular to the first geometric line when the first conductive structure and the second conductive structure are positioned over the base pad.

4. The apparatus of claim 2, wherein a first rectangle defined collectively by the magnetic material, first conductive structure, and second conductive structure has a width c and a length c+d, and wherein c divided by d is equal to c+d divided by c.

5. The apparatus of claim 3, wherein a second rectangle formed by the base pad has a width a and a length a+b, and wherein a divided by b is equal to a+b divided by a.

6. The apparatus of claim 2, wherein the first and second conductive structures collectively define a first center point located in a center of a geometric rectangle covering surface areas of the first and second conductive structures, wherein the base pad defines a second center point located in a center of a geometric rectangle covering a surface area of the base pad, and wherein a set of points, defined by offset distances between the first and second points, at which an amount of coupling is above a threshold defines a rectangular region, the amount of coupling defined at least in part by a value derived from a first coupling coefficient measuring coupling between the first conductive structure and the base pad and a second coupling coefficient measuring coupling between the second conductive structure and the base pad.

7. The apparatus of claim 6, wherein the base pad comprises a loop defining a fourth area, wherein a length of the rectangular region is substantially equal to plus or minus one-half multiplied by a value derived from a difference between a length of the fourth area and a width of the third area.

8. The apparatus of claim 7, wherein the base pad has a first outer edge along a first side and a first inner edge along the first side and a second outer edge along a second side and a second inner edge along the second side, and wherein a width of the rectangular region is equal to plus or minus one-half multiplied by a distance between a first center point between the first outer edge and the first inner edge and a second center point between the second outer edge and the second inner edge.

9. The apparatus of claim 1, wherein the first conductive structure has a first polarized magnetic moment in a first direction, wherein the second conductive structure has a second polarized magnetic moment in a second direction perpendicular to the first direction.

10. The apparatus of claim 1, wherein the first conductive structure and the second conductive structure are positioned to maintain an absence of mutual coupling between the first conductive structure and the second conductive structure.

11. The apparatus of claim 10, wherein a net sum of a magnetic field generated by the first conductive structure and that intersects the second conductive structure is zero.

12. The apparatus of claim 1, wherein the first conductive structure comprises at least one of:
    a first coil wound to enclose the first area and the second area; or
    a second and third coil wound to enclose the first area and second area, respectively.

13. The apparatus of claim 1, wherein the first and second conductive structures are capacitively loaded and configured to resonate at a resonant frequency equal to a frequency of the magnetic field, and wherein the first and second conductive structures are configured to inductively receive power via the magnetic field at a level sufficient to charge or power a vehicle.

14. The apparatus of claim 1, further comprising a receive circuit coupled to the first and second conductive structures and configured to power or charge an electric vehicle based on at least a portion a combination of the power received via the first and second conductive structures.

15. The apparatus of claim 1, further comprising a controller configured to receive measurements indicative of an amount of coupling between each of the first and second conductive structures and a transmitter conductive structure, the controller configured to selectively de-activate the first or second conductive structure based on the amount of coupling.

16. The apparatus of claim 1, wherein the apparatus further comprises a controller configured detect an amount of coupling between each of the first and second conductive structures and a transmitter conductive structure and configured to control at least one of an amplitude or a phase of currents in the first and second conductive structures based on the amount of coupling.

17. The apparatus of claim 16, wherein the controller is configured to control at least one of the amplitude or the phase of the currents to maintain a level of electromagnetic emissions below a threshold.

18. A method of wirelessly communicating power comprising:
    wirelessly receiving power via a first conductive structure via a magnetic field generated by a base pad having a length greater than a width, the first conductive structure having a length greater than a width, the first conductive structure comprising a first loop and a second loop enclosing a first area and a second area, respectively and the first conductive structure having a first edge and a second edge each intersecting a geometric line along the length of the first conductive structure; and
    wirelessly receiving power generated by the base pad via a second conductive structure positioned between the first conductive structure and a magnetic material, the second conductive structure enclosing a third area, the second conductive structure having a length greater than a width, the length of the second conductive structure being equal to at least a distance along the geometric line between the first edge and the second edge of the first conductive structure,
    wherein the length of the first conductive structure is disposed substantially parallel to the length of the second conductive structure and substantially perpendicular to the length of the base pad.

19. The method of claim 18, wherein the magnetic material, the first conductive structure, and the second conductive structure are rectangular having lengths aligned along the first geometric line, wherein the first conductive structure and the second conductive structure are configured to be positioned over the base pad comprising a third conductive structure configured to generate the magnetic field, the third conductive structure being rectangular and having a second geometric line intersecting the length of the third conductive structure that is perpendicular to the first geometric line when the first conductive structure and the second conductive structure are positioned over the third conductive structure.

20. The method of claim 19, wherein the first and second conductive structures collectively define a first center point located in a center of a geometric rectangle covering surface areas of the first and second conductive structures, wherein the third conductive structure defines a second center point located in a center of a geometric rectangle covering a surface area of the third conductive structure, and wherein a set of points, defined by offset distances between the first and second points, at which an amount of coupling is above a threshold defines a rectangular region, the amount of coupling defined at least in part by a value derived from a first coupling coefficient measuring coupling between the first conductive structure and the third conductive structure and a second coupling coefficient measuring coupling between the second conductive structure and the third conductive structure.

21. The method of claim 18, wherein the first conductive structure and the second conductive structure are positioned to maintain an absence of mutual coupling between the first conductive structure and the second conductive structure.

22. The method of claim 18, wherein the first and second conductive structures are capacitively loaded and configured to resonate at a resonant frequency equal to a frequency of the magnetic field, and wherein the wirelessly receiving power comprises inductively receiving power via the magnetic field at the first and second conductive structures at a level sufficient to charge or power a vehicle.

23. A system for wirelessly communicating power, the system comprising:
    a base pad having a length greater than a width and configured to generate a magnetic field to transmit wireless power; and
    a vehicle pad comprising:
        a first conductive structure configured to wirelessly receive power via a magnetic field generated by the base pad, the first conductive structure having a length greater than a width, the first conductive structure comprising a first loop and a second loop enclosing a first area and a second area, respectively and the first conductive structure having a first edge and a second edge each intersecting a first geometric line along the length of the first conductive structure; and a second conductive structure positioned between the first conductive structure and a magnetic material and configured to wirelessly receive power via the magnetic field generated by the base pad, the second conductive structure comprising a third loop enclosing a third area, the second conductive structure having a length greater than a width, the length of the second conductive structure being equal to at least a distance along the first geometric line between the first edge and the second edge of the first conductive structure, wherein the length of the first conductive structure is disposed substantially parallel to the length of the second conductive structure and substantially perpendicular to the length of the base pad.

24. The system of claim 23, wherein the length of the second conductive structure is along the length of the first conductive structure.

25. The system of claim 24, wherein the base pad comprises a third conductive structure having a width along a first axis and a length along a second axis perpendicular to the first axis, the width of the third conductive structure greater than the length of the third conductive structure.

26. The system of claim 25, wherein during wireless power transmission, the width of the second conductive structure is positioned along the first axis and the length of the second conductive structure is positioned along the second axis.

27. The system of claim 25, wherein the first conductive structure has an axis of polarization along the length of the first conductive structure, the axis of polarization oriented perpendicularly to the first axis.

28. The system of claim 23, wherein the magnetic material, the first conductive structure, and the second conductive structure are rectangular having lengths aligned along the first geometric line.

29. The system of claim 28, wherein the first conductive structure and the second conductive structure are configured to be positioned over the base pad, the base pad having a second geometric line intersecting a length of the base pad and oriented perpendicularly to the first geometric line when the first conductive structure and the second conductive structure are positioned over the base pad.

30. The system of claim 28, wherein a first rectangle defined collectively by the magnetic material, first conductive structure, and second conductive structure has a width c and a length c+d, and wherein c divided by d is equal to c+d divided by c.

31. The system of claim 30, wherein a second rectangle formed by the base pad has a width a and a length a+b, and wherein a divided by b is equal to a+b divided by a.

32. The system of claim 28, wherein the first and second conductive structures collectively define a first center point located in a center of a geometric rectangle covering surface areas of the first and second conductive structures, wherein the base pad defines a second center point located in a center of a geometric rectangle covering a surface area of the base pad, and wherein a set of points, defined by offset distances between the first and second points, at which an amount of coupling is above a threshold defines a rectangular region, the amount of coupling defined at least in part by a value derived from a first coupling coefficient measuring coupling between the first conductive structure and the base pad and a second coupling coefficient measuring coupling between the second conductive structure and the base pad.

33. The system of claim 32, wherein the base pad comprises a loop defining a fourth area, wherein a length of the rectangular region is substantially equal to plus or minus one-half multiplied by a value derived from a difference between a length of the fourth area and a width of the third area.

34. The system of claim 33, wherein the base pad has a first outer edge along a first side and a first inner edge along the first side and a second outer edge along a second side and a second inner edge along the second side, and wherein a width of the rectangular region is equal to plus or minus one-half multiplied by a distance between a first center point between the first outer edge and the first inner edge and a second center point between the second outer edge and the second inner edge.

35. The system of claim 23, wherein the first conductive structure has a first polarized magnetic moment in a first direction, wherein the second conductive structure has a second polarized magnetic moment in a second direction perpendicular to the first direction.

36. The system of claim 23, wherein the first conductive structure and the second conductive structure are positioned to maintain an absence of mutual coupling between the first conductive structure and the second conductive structure.

37. The system of claim 36, wherein a net sum of a magnetic field generated by the first conductive structure and that intersects the second conductive structure is zero.

38. The system of claim 23, wherein the first conductive structure comprises at least one of:
a first coil wound to enclose the first area and the second area; or
a second and third coil wound to eclose the first area and second area, respectively.

39. The system of claim 23, wherein the first and second conductive structures are capacitively loaded and configured to resonate at a resonant frequency equal to a frequency of the magnetic field, and wherein the first and second conductive structures are configured to inductively receive power via the magnetic field at a level sufficient to charge or power a vehicle.

40. The system of claim 23, further comprising a receive circuit coupled to the first and second conductive structures and configured to power or charge an electric vehicle based on at least a portion a combination of the power received via the first and second conductive structures.

41. The system of claim 23, further comprising a controller configured to receive measurements indicative of an amount of coupling between each of the first and second conductive structures and the base pad, the controller configured to selectively de-activate the first or second conductive structure based on the amount of coupling.

42. The system of claim 23, wherein the apparatus further comprises a controller configured detect an amount of coupling between each of the first and second conductive structures and the base pad and configured to control at least one of an amplitude or a phase of currents in the first and second conductive structures based on the amount of coupling.

43. The system of claim 42, wherein the controller is configured to control at least one of the amplitude or the phase of the currents to maintain a level of electromagnetic emissions below a threshold.

* * * * *